(12) United States Patent
Zhao et al.

(10) Patent No.: US 11,587,234 B2
(45) Date of Patent: Feb. 21, 2023

(54) GENERATING CLASS-AGNOSTIC OBJECT MASKS IN DIGITAL IMAGES

(71) Applicant: Adobe Inc., San Jose, CA (US)

(72) Inventors: Yinan Zhao, Austin, TX (US); Brian Price, San Jose, CA (US); Scott Cohen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 134 days.

(21) Appl. No.: 17/151,111

(22) Filed: Jan. 15, 2021

(65) Prior Publication Data

US 2022/0230321 A1   Jul. 21, 2022

(51) Int. Cl.
| | | |
|---|---|---|
| *G06T 7/11* | (2017.01) | |
| *G06T 7/168* | (2017.01) | |
| *G06T 9/00* | (2006.01) | |
| *G06T 5/00* | (2006.01) | |
| *G06T 7/181* | (2017.01) | |

(52) U.S. Cl.
CPC ............... *G06T 7/11* (2017.01); *G06T 5/004* (2013.01); *G06T 7/168* (2017.01); *G06T 7/181* (2017.01); *G06T 9/002* (2013.01); *G06T 9/008* (2013.01)

(58) Field of Classification Search
CPC . G06T 7/11; G06T 5/004; G06T 7/168; G06T 7/181; G06T 9/002; G06T 9/008; G06T 2207/20081; G06T 2207/20084; G06T 7/194
See application file for complete search history.

(56) References Cited

U.S. PATENT DOCUMENTS

| | | |
|---|---|---|
| 6,389,168 B2 | 5/2002 | Altunbasak et al. |
| 6,469,706 B1 | 10/2002 | Syeda-Nahmood |
| 8,107,726 B2 | 1/2012 | Xu et al. |
| 8,385,688 B2 | 2/2013 | Gong et al. |

(Continued)

FOREIGN PATENT DOCUMENTS

| | | |
|---|---|---|
| CN | 103366178 A | 10/2013 |
| CN | 107563494 A | 1/2018 |

(Continued)

OTHER PUBLICATIONS

Examination Report as received in Australian application 2020202602 dated Oct. 18, 2021.

(Continued)

*Primary Examiner* — Charles T Shedrick
(74) *Attorney, Agent, or Firm* — Keller Preece PLLC

(57) ABSTRACT

The present disclosure relates to a class-agnostic object segmentation system that automatically detects, segments, and selects objects within digital images irrespective of object semantic classifications. For example, the object segmentation system utilizes a class-agnostic object segmentation neural network to segment each pixel in a digital image into an object mask. Further, in response to detecting a selection request of a target object, the object segmentation system utilizes a corresponding object mask to automatically select the target object within the digital image. In some implementations, the object segmentation system utilizes a class-agnostic object segmentation neural network to detect and automatically select a partial object in the digital image in response to a target object selection request.

20 Claims, 14 Drawing Sheets

(56) References Cited

U.S. PATENT DOCUMENTS

| | | | |
|---|---|---|---|
| 8,818,024 B2 | 8/2014 | Chen et al. | |
| 8,879,855 B2* | 11/2014 | Angelova | G06K 9/6267 |
| | | | 382/226 |
| 9,129,191 B2 | 9/2015 | Cohen et al. | |
| 9,171,230 B2 | 10/2015 | Jiang et al. | |
| 9,443,316 B1 | 9/2016 | Takeda et al. | |
| 9,576,223 B2 | 2/2017 | Aupetit et al. | |
| 9,619,488 B2 | 4/2017 | Ambardekar et al. | |
| 9,720,934 B1 | 8/2017 | Dube et al. | |
| 9,746,981 B2 | 8/2017 | Zachut et al. | |
| 9,858,496 B2 | 1/2018 | Sun et al. | |
| 10,146,751 B1 | 12/2018 | Zhang | |
| 10,192,129 B2 | 1/2019 | Price et al. | |
| 10,216,766 B2 | 2/2019 | Lin et al. | |
| 10,496,880 B2 | 12/2019 | Ye | |
| 10,713,794 B1 | 7/2020 | He et al. | |
| 10,740,647 B2 | 8/2020 | Du et al. | |
| 10,893,283 B2 | 1/2021 | Chen et al. | |
| 11,010,605 B2 | 5/2021 | Nord et al. | |
| 11,107,219 B2 | 8/2021 | Cohen et al. | |
| 11,176,384 B1* | 11/2021 | Yang | G06N 3/0454 |
| 11,182,408 B2 | 11/2021 | Wu et al. | |
| 11,417,097 B2* | 8/2022 | Lin | G06V 20/49 |
| 2003/0179213 A1 | 9/2003 | Liu | |
| 2003/0198380 A1 | 10/2003 | Shin et al. | |
| 2003/0233224 A1 | 12/2003 | Marchisio et al. | |
| 2008/0069444 A1 | 3/2008 | Wilensky | |
| 2008/0117209 A1* | 5/2008 | Razeto | G06T 7/136 |
| | | | 345/424 |
| 2009/0281925 A1 | 11/2009 | Winter et al. | |
| 2010/0158412 A1 | 6/2010 | Wang et al. | |
| 2010/0166321 A1 | 7/2010 | Sawant et al. | |
| 2011/0026835 A1 | 2/2011 | Ptucha et al. | |
| 2011/0029553 A1 | 2/2011 | Bogart et al. | |
| 2011/0085739 A1 | 4/2011 | Zhang et al. | |
| 2011/0216973 A1 | 9/2011 | Mojsilovic | |
| 2013/0257886 A1 | 10/2013 | Kerofsky et al. | |
| 2014/0334722 A1 | 11/2014 | Bloore et al. | |
| 2015/0169142 A1 | 6/2015 | Longo et al. | |
| 2015/0170005 A1 | 6/2015 | Cohen et al. | |
| 2015/0213058 A1* | 7/2015 | Ambardekar | G06V 10/751 |
| | | | 707/723 |
| 2015/0228086 A1 | 8/2015 | Maurer et al. | |
| 2015/0305609 A1* | 10/2015 | Hoberman | A61B 1/00009 |
| | | | 382/128 |
| 2015/0379006 A1 | 12/2015 | Dorner et al. | |
| 2016/0342863 A1 | 11/2016 | Kwon et al. | |
| 2017/0017696 A1 | 1/2017 | Alonso | |
| 2017/0083752 A1 | 3/2017 | Saberian et al. | |
| 2017/0140236 A1 | 5/2017 | Price et al. | |
| 2017/0206431 A1 | 7/2017 | Sun et al. | |
| 2017/0255378 A1 | 9/2017 | Desai | |
| 2017/0277948 A1 | 9/2017 | Dhua et al. | |
| 2017/0287137 A1 | 10/2017 | Lin et al. | |
| 2017/0364771 A1* | 12/2017 | Pinheiro | G06N 3/0454 |
| 2018/0089203 A1 | 3/2018 | Soni et al. | |
| 2018/0108137 A1 | 4/2018 | Price et al. | |
| 2018/0121768 A1 | 5/2018 | Lin et al. | |
| 2018/0240243 A1 | 8/2018 | Kim et al. | |
| 2018/0260793 A1* | 9/2018 | Li | G06N 7/005 |
| 2018/0267997 A1 | 9/2018 | Lin et al. | |
| 2018/0285686 A1* | 10/2018 | Pinheiro | G06N 3/08 |
| 2019/0019318 A1 | 1/2019 | Cinnamon et al. | |
| 2019/0096125 A1 | 3/2019 | Schulter et al. | |
| 2019/0108250 A1 | 4/2019 | Miller et al. | |
| 2019/0130229 A1 | 5/2019 | Lu et al. | |
| 2019/0252002 A1 | 8/2019 | Ding et al. | |
| 2019/0354609 A1 | 11/2019 | Huang et al. | |
| 2020/0020108 A1 | 1/2020 | Pao et al. | |
| 2020/0074185 A1* | 3/2020 | Rhodes | G06F 17/18 |
| 2020/0175344 A1 | 6/2020 | Li et al. | |
| 2020/0218931 A1 | 7/2020 | Karlinsky et al. | |
| 2020/0242357 A1* | 7/2020 | Brouard | G06V 20/182 |
| 2020/0250538 A1 | 8/2020 | Li et al. | |
| 2020/0302230 A1 | 9/2020 | Chang et al. | |
| 2020/0334487 A1 | 10/2020 | Du et al. | |
| 2020/0334501 A1 | 10/2020 | Lin et al. | |
| 2021/0027448 A1 | 1/2021 | Cohen et al. | |
| 2021/0027471 A1 | 1/2021 | Cohen et al. | |
| 2021/0027497 A1 | 1/2021 | Ding et al. | |
| 2021/0192375 A1 | 6/2021 | Xia et al. | |
| 2021/0366128 A1* | 11/2021 | Kim | G06T 7/194 |
| 2021/0397876 A1* | 12/2021 | Hemani | G06V 10/82 |
| 2022/0084209 A1* | 3/2022 | Wang | G16H 30/40 |
| 2022/0101531 A1 | 3/2022 | Zhang et al. | |
| 2022/0230321 A1* | 7/2022 | Zhao | G06T 9/002 |

FOREIGN PATENT DOCUMENTS

| | | | | |
|---|---|---|---|---|
| CN | 112561920 A | * | 3/2021 | G06K 9/00765 |
| DE | 102019102484 A1 | * | 8/2020 | G06F 16/55 |
| EP | 3 300 024 A1 | | 3/2018 | |
| WO | WO 2017/007626 A1 | | 1/2017 | |
| WO | WO-2017198909 A1 | * | 11/2017 | G06K 9/6256 |
| WO | WO-2019110583 A1 | * | 6/2019 | G06K 9/00147 |
| WO | WO-2020101777 A1 | * | 5/2020 | G06K 9/00664 |
| WO | WO-2021179205 A1 | * | 9/2021 | G06T 7/0012 |

OTHER PUBLICATIONS

Intention to Grant as received in Australian application 2018250370 dated Oct. 21, 2021.
U.S. Appl. No. 16/518,810, Oct. 27, 2021, Office Action.
Notice of Grant as received in Australian application 2020201988 dated Mar. 17, 2022.
U.S. Appl. No. 16/919,383, Feb. 10, 2022, Notice of Allowance.
U.S. Appl. No. 16/800,415, Feb. 17, 2022, Preinterview 1st Office Action.
Combined Search and Examination Report as received in UK Application GB2005865.7 dated Jan. 11, 2021.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
U.S. Appl. No. 16/518,795, Dec. 7, 2021, Notice of Allowance.
Examination Report as received in Australian application 2020202601 dated Nov. 5, 2021.
Examination Report as received in United Kingdom application GB2005865.7 dated Dec. 14, 2021.
U.S. Appl. No. 16/518,850, Jan. 25, 2022, Office Action.
Examination Report as received in Australian application 2018250370 dated Jun. 10, 2021.
U.S. Appl. No. 16/518,880, Apr. 7, 2021, Notice of Allowance.
U.S. Appl. No. 16/518,810, Apr. 16, 2021, 1st Action Office Action.
U.S. Appl. No. 16/518,795, May 6, 2021, Office Action.
U.S. Appl. No. 16/817,418, Mar. 22, 2021, Notice of Allowance.
U.S. Appl. No. 16/518,850, Apr. 6, 2021, Preinterview 1st Office Action.
U.S. Appl. No. 16/518,850, May 28, 2021, 1st Action Office Action.
Examination Report as received in United Kingdom application GB2005865.7 dated Sep. 14, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,795, Sep. 15, 2021, Notice of Allowance.
Intention to Grant as received in United Kingdom Application GB2005865.7 dated Mar. 23, 2022.
Intention to Grant as received in United Kingdom Application GB2004362.6 dated Apr. 8, 2022.
U.S. Appl. No. 16/518,810, Apr. 14, 2022, Office Action.
U.S. Appl. No. 16/800,415, Apr. 4, 2022, 1st Action Office Action.
J. Uijlings, K. van de Sande, T. Gevers, and A. Smeulders. Selective Search For Object Recognition, IJCV, 2013.
Joseph Redmon, Santosh Divvala, Ross Girshick, Ali Farhadi: You

(56) References Cited

OTHER PUBLICATIONS

Only Look Once: Unified, Real-Time Object Detection, arXiv:1506.02640, May 6, 2016.
Bency, Archith John, et al. "Weakly supervised localization using deep feature maps." European Conference on Computer Vision. Springer, Cham, 2016, See Abstract and section 3.4.
Bolanos, Marc, and Petia Radeva. "Simultaneous food localization and recognition." 2016 23rd International Conference on Pattern Recognition (ICPR). IEEE, 2016 See Abstract, Figure 3 and the Methodology section.
Combined Search and Examination Report as received in United Kingdom Application GB1817588.5 dated Apr. 8, 2019.
Combined Search and Examination Report as received in United Kingdom Application GB2005714.7 dated Sep. 3, 2020.
Combined Search and Examination Report as received in United Kingdom Application GB2005704.8 dated Sep. 24, 2020.
Combined Search and Examination Report as received in United Kingdom Application GB2004362.6 dated Nov. 13, 2020.
Intention to Grant as received in United Kingdom Application GB1817588.5 dated Aug. 13, 2020.
Ning Xu et al., "Deep GrabCut for Object Selection," published Jul. 14, 2017.
S. Ren, K. He, R. Girshick, and J. Sun, Faster r-cnn: Towards real-time object detection with region proposal networks, NIPS, 2015.
Yi-Hsuan Tsai et al., "Sky is Not the Limit: Semantic-Aware Sky Replacement," ACM Transactions on Graphics (SIGGRAPH), 2016.
Yufei Wang et al., "Concept Mask: Large-Scale Segmentation from Semantic Concepts," The European Conference on Computer Vision (ECCV), Aug. 18, 2018.
Kirillov, Alexander & Girshick, Ross & He, Kaiming & Dollar, Piotr. (2019). Panoptic Feature Pyramid Networks. 6392-6401. 10.1109/CVPR.2019.00656.
Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).
Wang, Jiang, et al. "Learning fine-grained image similarity with deep ranking." Proceedings of the IEEE Conference on Computer Vision and Pattern Recognition. 2014. (Year: 2014).
Niblack, Carlton Wayne, et al. "QBIC project: querying images by content, using color, texture, and shape." Storage and retrieval for image and video databases. vol. 1908. International Society for Optics and Photonics, 1993. (Year: 1993).
Wan et al. Deep Learning for Content-Based Image Retrieval: Comprehensive Study, Published in MM '14: Proceedings of the ACM International Conference on Multimedia: Nov. 3-7, 2014, Orlando. pp. 157-166. http://doi.org/10.1145/2647868.2654948 (Year: 2014).
Carion, Nicolas et al. "End-to-End Object Detection with Transformers," arXiv preprint arXiv:2005.12872 (2020).
U-net architecture and use techniques and approaches found in Olaf Ronneberger et al., "U-Net: Convolutional Networks for Biomedical Image Segmentation," submitted on May 18, 2015, arXiv:1505.049597.
Wang et al. in Joint Object and Part Segmentation using Deep Learned Potentials, In Proc. International Conference on Computer Vision (ICCV), 2015.
J. Dong et al.; Towards Unified Human Parsing And Pose Estimation, In CVPR, pp. 843-850, 2014.
U.S. Appl. No. 15/921,492, Dec. 27, 2019, Office Action.
U.S. Appl. No. 15/921,492, Apr. 2, 2020, Notice of Allowance.
U.S. Appl. No. 16/518,880, Dec. 23, 2020, Office Action.
U.S. Appl. No. 16/518,810, Jan. 8, 2021, Preinterview 1st Office Action.
U.S. Appl. No. 16/518,795, Jan. 21, 2021, Preinterview 1st Office Action.
U.S. Appl. No. 16/518,810, Apr. 10, 2022, Office Action.
U.S. Appl. No. 16/518,850, Jun. 1, 2022, Notice of Allowance.
U.S. Appl. No. 16/800,415, Jul. 20, 2022, Notice of Allowance.
U.S. Appl. No. 16/518,810, Jul. 15, 2021, Office Action.
U.S. Appl. No. 16/518,850, Jun. 18, 2021, Office Action.
Examination Report as received in Australian application 2020201988 dated Oct. 29, 2021.
U.S. Appl. No. 16/518,850, Nov. 4, 2021, Office Action.
Ahmed et al, Semantic Object Selection, IEEE Conference on Computer Vision and Pattern Recognition (pp. 3150-3157) (Year: 2014).
Hu et al, Segmentation from Natural Language Expression, Arxiv:1603.0618 (Year: 2016).
Deng et al, You Only Look & Listen Once: Towards Fast and Accurate Visual Grounding, arXiv:1902.04213 (Year: 2019).
U.S. Appl. No. 16/518,810, filed Dec. 5, 2022, Notice of Allowance.
U.S. Appl. No. 17/387,195, filed Oct. 24, 2022, Office Action.
U.S. Appl. No. 17/158,527, filed Dec. 15, 2022, Office Action.

* cited by examiner

GENERATING CLASS-AGNOSTIC OBJECT MASKS IN DIGITAL IMAGES

BACKGROUND

Recent years have seen a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables both professionals and hobbyists to perform a variety of digital image editing operations. Similarly, improvements in software enable individuals to modify, filter, or otherwise edit digital images across a variety of computing devices.

Notwithstanding these improvements, conventional systems continue to suffer from several problems with respect to object selection. For instance, when segmenting objects within images, many conventional systems are accurate, inefficient, and inflexible. For example, conventional systems are often limited to segmenting only objects with prior known semantic meaning, often fail to segment object parts or are inefficient at doing so, and/or require prior knowledge of a class or semantic meaning of an object to be segmented.

BRIEF SUMMARY

Implementations of the present disclosure provide benefits and/or solve one or more of the foregoing or other problems in the art with systems, non-transitory computer-readable media, and methods that accurately and flexibly utilize a class-agnostic object segmentation model to segment objects (and object parts) in digital images. For example, the disclosed systems generate a class-agnostic object segmentation neural network that segments objects in a digital image without classifying the objects. In various implementations, the disclosed systems segment every object in a digital image irrespective of whether the object has a known semantic classification. In this manner, the disclosed systems are able to generate an object mask and automatically select any object in a digital image. Further, in some implementations, the disclosed systems also segment portions of an object (e.g., a partial object or object part). In these implementations, the disclosed systems automatically segment parts of an object in a digital image without classifying the object or the parts belonging to the object.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
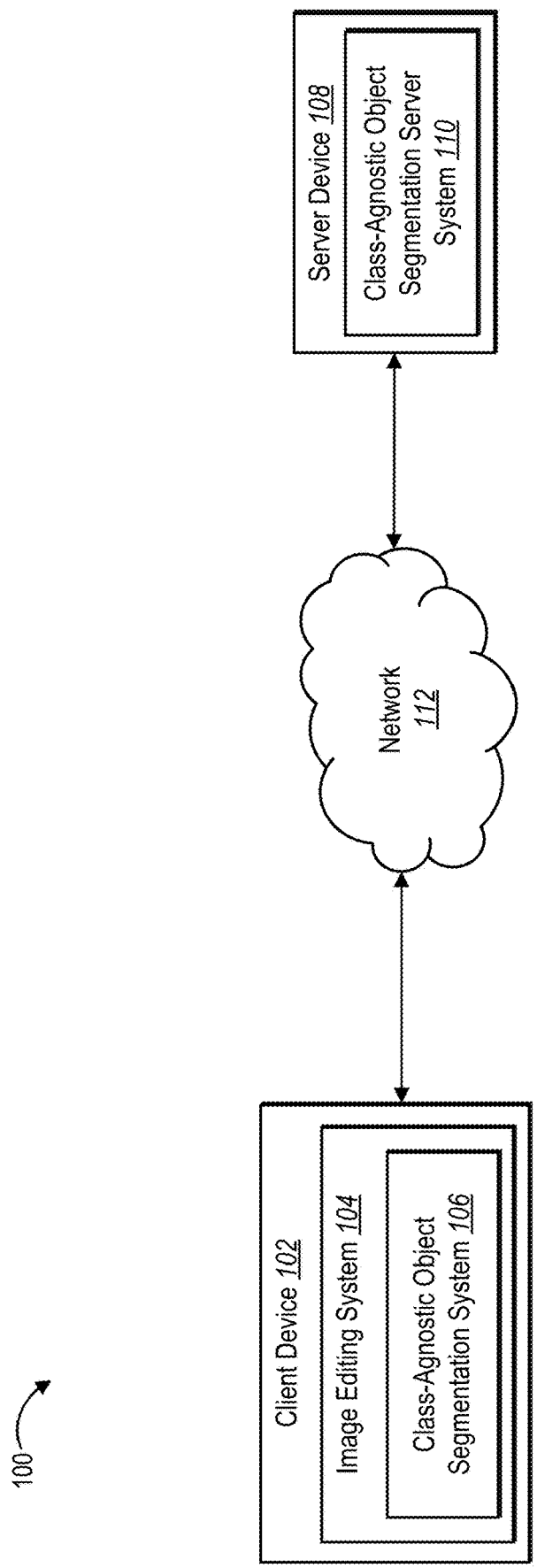
FIG. 1 illustrates a schematic diagram of a system environment in which an object segmentation system operates in accordance with one or more implementations.

This disclosure describes one or more implementations of a class-agnostic object segmentation system that automatically segments and allows for selection of objects within digital images. In one or more implementations, the class-agnostic object segmentation system (or simply "object segmentation system") generates a class-agnostic object segmentation model that segments objects within digital images irrespective of semantic classification. For example, the object segmentation system utilizes a class-agnostic object segmentation neural network to segment each pixel in a digital image into an object mask. Further, in response to detecting a selection request of a target object, the object segmentation system utilizes a corresponding object mask to automatically select the target object within the digital image. In some implementations, the object segmentation system utilizes a class-agnostic object segmentation neural network to automatically segment and select a partial object in the digital image in response to a selection request. Indeed, because users are more interested in the separation of objects (and partial objects) rather than the semantic meaning of known objects, the object segmentation system focuses on detecting all objects in a digital image instead of only classifiable objects.

To illustrate, in several implementations, the object segmentation system receives a digital image that includes various objects. In these implementations, the object segmentation system segments each pixel in the digital image into object masks utilizing a class-agnostic object segmentation neural network that segments objects in digital images irrespective of semantic classifications. Further, in these implementations, the object segmentation system detects a selection request of a target object in the digital image, and, in response, provides a target object mask of the target object.

As mentioned above, in one or more implementations, the object segmentation system utilizes a class-agnostic object segmentation neural network (or simply "class-agnostic segmentation network"). In various implementations, the object segmentation system generates the class-agnostic segmentation network to segment objects within digital images regardless of the object's classification. Thus, rather than only segmenting objects in a digital image that belong to known classifications, the object segmentation system is able to segment all objects in the digital image, even if the object is unknown. Indeed, in a number of implementations, the object segmentation system segments every pixel in the digital image into an object mask without labeling or classifying the objects.

In one or more implementations, the object segmentation system operates within, or in connection with, an image editing application. For example, a digital image is loaded within an image editing application. In various implementations, upon loading the digital image (or detecting the selection of an object selection tool), the object segmentation system segments the digital image and generates object masks for each object within the digital image. Then, upon detecting a selection request of a target object, the object segmentation system identifies and utilizes an object mask corresponding to the target object to automatically select the target object within the digital image.

In various implementations, the object segmentation system facilitates the automatic selection of partial objects (i.e., object parts). For example, in some implementations, the object segmentation system detects a second or different selection request of a target partial object within a target object. In response, the object segmentation system identifies an object mask corresponding to the partial object and provides the object mask in response to the selection request.

As mentioned above, in various implementations, the object segmentation system generates object masks for partial objects. For instance, the object segmentation system utilizes the class-agnostic segmentation network to segment partial objects in addition to object parts. For example, in some implementations, the class-agnostic object segmentation system generates and/or modifies the class-agnostic segmentation network to include additional neural network layers and components that improve partial object segmentation.

As an example of segmenting partial objects, in a number of implementations, the object segmentation system generates a feature vector (or feature map) from the digital image utilizing an encoder of the class-agnostic segmentation network. In these implementations, the object segmentation system modifies the feature vector based on an affinity matrix and a dataset-encoded spatial location matrix. Further, in these implementations, the object segmentation system decodes the modified feature vector utilizing a decoder of the class-agnostic segmentation network to generate partial object masks for objects in the digital image. In addition, the object segmentation system detects a selection request of a target partial object in the digital image, and, in response, provides a target partial object mask of the target partial object from the generated partial object masks.

As mentioned above, in various implementations, the object segmentation system utilizes an affinity matrix and a dataset-encoded spatial location matrix within the class-agnostic segmentation network to segment partial objects within a digital image. In one or more implementations, an affinity matrix indicates encoded feature similarities between pixels of a digital image. For example, upon encoding pixels of the digital image into a feature vector (or feature map) utilizing the class-agnostic segmentation network, the object segmentation system generates an affinity matrix that indicates feature similarities between a given pixel and the other pixels in the digital image.

In additional implementations, the object segmentation system also utilizes the dataset-encoded spatial location matrix. As described below, in various implementations, the object segmentation system learns the dataset-encoded spatial location matrix across a dataset of digital images to uniquely encode location information at each pixel. In some implementations, the object segmentation system applies the affinity matrix generated for a digital image to the dataset-encoded spatial location matrix generated from a dataset of digital images. For example, in one or more implementations, the object segmentation system applies the unique encodings learned for each location in the dataset-encoded spatial location matrix to corresponding locations within the affinity matrix to generate the modified feature vector for the digital image.

In one or more implementations, the object segmentation system reshapes the modified feature vector to fit the class-agnostic segmentation network. For example, utilizing the class-agnostic segmentation network, the object segmentation system encodes a feature vector of a first dimension. Then, the object segmentation system generates the modified feature vector, which changes the dimensionality of the feature vector to a second dimension. Further, the object segmentation system can reshape the modified feature vector to the first dimension before decoding the modified feature vector.

Additionally, in various implementations, the object segmentation system decodes the modified feature vector to generate the object masks for objects and/or partial objects. For example, in one or more implementations, the object segmentation system decodes the modified feature vector to determine how the pixels in the digital image segment into different unclassified objects.

As mentioned above, in various implementations, the object segmentation system generates and/or learns a class-agnostic segmentation network able to segment objects (and/or partial objects) in digital images regardless of whether the object belongs to a known classification. To illustrate, in one or more implementations, the object segmentation system generates a set of predicted unclassified object masks for the objects in digital images utilizing the class-agnostic segmentation network. Also, in these implementations, the object segmentation system matches the predicted unclassified object masks to a set of unclassified (e.g., class-agnostic) ground truth object masks. For example, the object segmentation system determines a permutation that maximizes overlap between the predicted unclassified object masks and the unclassified ground truth object masks.

Further, in these implementations, the object segmentation system determines a loss metric that measures the differences between the matched predicted unclassified object masks and unclassified ground truth object masks. Then, based on the measured loss metric, the object segmentation system modifies, tunes, and learns parameters of the class-agnostic segmentation network, including the encoder, the decoder, and/or the dataset-encoded spatial location matrix.

In one or more implementations, the object segmentation system determines a permutation that maximizes overlap between the predicted unclassified object masks and the unclassified ground truth object masks utilizing one or more matching models. Because the predicted object masks and the ground truth object masks are both unclassified (e.g., unlabeled), the object segmentation system first identifies corresponding matches between the predicted object masks and the ground truth object masks for each digital image, which poses a challenge when learning how to generate accurately predicted object masks. Accordingly, as described below, in various implementations, the object segmentation system utilizes an object detection similarity algorithm to perform the matches.

As mentioned above, conventional systems face a number of problems with regard to accuracy, efficiency, and flexibility of computing device operations in the field of digital image editing, and in particular, object segmentation. As a first example, many conventional systems are inaccurate. For instance, as mentioned above, several conventional systems fail to accurately recognize objects in digital images. In other cases, many conventional systems are trained to identify and segment certain objects in digital images, but not all objects. Accordingly, while these conventional systems are able to recognize objects belonging to a predefined set of classes learned during training, these conventional systems are unable to accurately recognize any other objects in digital images. Indeed, any pixels in a digital image that do not belong to a known classification are left unlabeled and unsegmented, which results in conventional systems not being able to select objects in the digital image. Moreover, in some cases, conventional systems misclassify and/or fail to accurately identify known objects.

Another problem with accuracy is that many conventional systems do not facilitate segmentation of object parts. As with segmenting objects, conventional system often require the object part to a predefined classification of object parts, which is often limited to a specific object type. Thus, unless a partial object within a digital image matches one of the predefined object part classifications, the object segmentation system will fail to recognize or segment the partial object. Further, when a conventional system is trained to segment object parts associated with a particular object type, the conventional system is more likely to miss detecting other types of objects in a digital image altogether.

Additionally, conventional systems are inflexible. As noted above, conventional systems are often rigidly limited to only recognizing objects that appeared during training. More particularly, many conventional systems utilize neural networks that identify and classify a limited predetermined set of objects in digital images. As a result, these conventional systems are restricted from recognizing objects in the digital images outside of the predetermined set. Similarly, most of these conventional systems are unable to detect and/or classify non-objects, such as the image backgrounds or other unquantifiable objects.

Moreover, many conventional systems are limited to detecting whole objects. For example, these conventional systems are unable to detect portions or parts of an object. Indeed, many conventional systems cannot directly address separating multiple objects of the same type onto separate object masks. Some conventional systems have attempted to overcome this shortcoming by adding complex and expensive components (e.g., additional neural network layers) as well as increased the training needed to implement these functions. However, while these modified conventional systems allow for increased identification of some object parts in the digital image, these conventional systems are still limited to known object parts previously recognized during training.

In addition, numerous conventional systems are inefficient. As mentioned above, some conventional systems employ complex and expensive components that attempt to identify a broader range of objects in digital images. Often, these measures are computationally expensive, resource-intensive, and operationally inefficient. Furthermore, to modify a conventional system to be able to identify object parts, additional training is often required to achieve greater specificity, which often results in manually labeling a significant number of ground truth samples. Often, each object and object part category has its own exclusive set of category labels that are not shared by other objects. Moreover, even with these added measures, as mentioned above, these conventional systems are still unable to identify all objects within digital images.

As another example of inefficiency, many conventional systems do not provide direct tools for automatic object selection of any object (or non-object) in a digital image. Instead, individuals are left to use generic image editing tools or tools designated for different purposes. As a result, users are unable to satisfactorily select a target object (or partial object). Further, these manual operations consume additional computing resources because they are being used inefficiently in unintended ways.

As previously mentioned, the object segmentation system of the present disclosure provides numerous advantages and benefits over conventional systems. Indeed, in many implementations, the object segmentation system improves accuracy, flexibility, and efficiency. To illustrate, as noted above, the object segmentation system generates a class-agnostic object segmentation model that accurately segments every pixel in a digital image into one or more object masks regardless of semantic meaning. For example, the object segmentation system learns a class-agnostic object segmentation neural network able to segment objects in digital images that were unseen in training. Indeed, by ignoring object classifications, the object segmentation system is able to segment all objects, even unknown objects (e.g., no object or pixel is missed), into an object mask.

Further, regarding accuracy improvements, in addition to segmenting every object in a digital image, in various implementations, the object segmentation system generates object masks for partial objects. For example, the object segmentation system learns a dataset-encoded spatial location matrix that uniquely encodes spatial location data for each pixel across an entire dataset, which when applied to a digital image, detects partial objects for selection. In particular, in one or more implementations, the object segmentation system encodes a digital image utilizing a class-agnostic object segmentation neural network to generate a feature vector and an affinity matrix from the feature vector. Further, the object segmentation system combines the affinity matrix of a digital image with the dataset-encoded spatial location matrix and decodes the result utilizing the class-agnostic object segmentation neural network to generate object masks for partial objects within a digital image.

In one or more implementations, the object segmentation system improves flexibility over conventional systems. For example, the object segmentation system is not limited to object types witnessed during training. Rather, the object segmentation system openly segments all objects (and optionally object parts) regardless of classification type or whether the object (or object part) has been witnessed during training.

Further, as mentioned above, many implementations of the object segmentation system flexibly provide an automatic segmentation of partial objects within digital images. For example, in one or more implementations, the object segmentation system utilizes the learned dataset-encoded spatial location matrix to learn groupings of pixels within partial objects regardless of the type or classification of the partial object or whole object in which the partial object resides. Thus, rather than being restricted to a limited set of known features and classifications, the object segmentation system detects all objects and even partial objects in a digital image.

Moreover, in one or more implementations, the object segmentation system improves efficiency over conventional systems. For example, through generating and utilizing a class-agnostic object segmentation neural network, the object segmentation system need not process a digital image numerous times using numerous feature matrices to identify objects that fit a known classification. Rather, the object segmentation system is able to quickly and efficiently segment all objects (i.e., all pixels) in a digital image into object masks. Indeed, the amount of computing processing and memory resources needed to learn (and execute) a class-agnostic object segmentation neural network is significantly reduced compared to conventional systems, which are limited to detection only a fraction of the objects in a digital image.

More specifically, by preemptively segmenting all object (and optionally object parts), the object segmentation system can quickly return an object mask for any selected object or object part. In other works, the object segmentation system utilizes the pre-emptive segmentation for any subsequent object selection requests without having to reprocess the digital image. Thus, the object segmentation system both increases efficiency and reduces processing time.

Further, in various implementations, the object segmentation system provides a graphical user interface that reduces the number of steps needed to select objects and partial objects within a digital image. For example, the object segmentation system enables a user to provide a selection request of a target object, and in response, the object segmentation system automatically selects the target object. To illustrate, as mentioned above, by segmenting objects without classifying them, the object segmentation system is able to return an object mask for any target object or partial object in a digital image in response to a selection request. Thus, unlike most conventional systems that require multiple tools and numerous manual operations to select an object, the object segmentation system facilitates accurate selection of an object with minimal user interaction (e.g., a single click or mouse hover).

Referring now to the figures, FIG. 1 illustrates a schematic diagram of a system environment 100 in which an object segmentation system 106 operates in accordance with one or more implementations. As shown in FIG. 1, the system environment 100 (or simply "environment 100") includes a client device 102 and a server device 108 connected via a network 112. Additional detail regarding these computing devices (e.g., the client device 102 and the server device 108) is provided below in connection with FIG. 9. Further, FIG. 9 also provides additional detail regarding networks, such as the illustrated network 112.

As shown, the environment 100 includes the client device 102. In various implementations, the client device 102 is associated with a user (e.g., a user client device), such as a user that requests automatic selection of objects in a digital image. The client device 102 includes an image editing system 104 and a class-agnostic object segmentation system 106 (or simply "object segmentation system 106"). In various implementations, the image editing system 104 implements the object segmentation system 106. In alternative implementations, the object segmentation system 106 is separate from the image editing system 104. While the image editing system 104 and the object segmentation system 106 are shown on the client device 102, in some implementations, the image editing system 104 and the object segmentation system 106 are located remotely from the client device 102 (e.g., on the server device 108), as further explained below.

The image editing system 104, in general, facilitates the creation, modification, sharing, and/or deletion of digital images. For instance, the image editing system 104 provides a variety of tools related to image creation and editing (e.g., photo-editing). For example, the image editing system 104 provides selection tools, color correction tools, image manipulation tools, etc. Moreover, the image editing system 104 optionally operates in connection with one or more applications to generate or modify digital images. For example, in one or more implementations, the image editing system 104 operates in connection with digital design applications or other image editing applications.

In various implementations, a digital image (or simply "image") includes a digital graphics file that when rendered displays one or more objects. An object can include both known and unknown objects as well as both quantifiable objects and unquantifiable objects (e.g., backgrounds, sky, street, water, walls). In various implementations, the image editing system 104 displays an image on a computing device, such as the client device 102. Additionally, in some implementations, an image includes one or more frames in a video or animation.

As mentioned above, the image editing system 104 includes the object segmentation system 106. As described in detail below, the object segmentation system 106 automatically segments objects (and partial objects) in images. In particular, the object segmentation system automatically segments objects in digital images without classifying the objects. For example, the object segmentation system utilizes a class-agnostic object segmentation model to generate an object mask for each object in an image. Then, in response to a user selection request with respect to a target object (or target partial object), the object segmentation system identifies a corresponding object mask to provide in response to the selection request of the target object.

For context, in many implementations, an object refers to a visual representation of a subject, concept, or sub-concept in an image. For instance, in various implementations, an object refers to a set of pixels in an image that combines to form a visual depiction of an item, article, partial item, component, or element. In some implementations, an object corresponds to a wide range of classes and concepts. For example, objects include specialty objects, conceptual objects, objects from known-classes, and unknown object classes (e.g., objects not used in training any of the object segmentation neural networks). In some embodiments, an object includes multiple instances of the object. For example, an image of a rose bush includes multiple instances of roses. In one or more embodiments, an object includes sub-objects, parts, or portions (i.e., partial objects). For example, the face or leg of a person are objects that are part of another object (e.g., the body of a person). As another example, a shirt is an object that can be part of another object (e.g., a person).

In addition, in various implementations, an object mask, object segmentation, or segmentation mask refer to an indication of a plurality of pixels portraying an object (or a part of an object). For example, in one or more implementations, an object mask includes a coherent region of adjoining pixels. In some implementations, an object mask includes a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

In some implementations, the object segmentation system utilizes an object mask model (as part of or separate from the class-agnostic object segmentation neural network) to generate object masks from the object segments. For example, the object mask model utilizes a segment of pixels in an image to generate an image layer that isolates pixels in the image corresponding to the segment. For instance, the object mask model generates an image layer with the same dimension as the image and assigns a value of 1 to all pixels that match the segmented pixels and a value of 0 to all other pixels. In this manner, when the object segmentation system 106 applies the object mask to the image, only pixels corresponding to the object within the segment are selected.

As shown, the environment 100 also includes the server device 108. The server device 108 includes an image class-agnostic object segmentation server system 110. For example, in one or more implementations, the image class-agnostic object segmentation server system 110 represents and/or provides similar functionality as described herein in connection with the object segmentation system 106. In some implementations, the image class-agnostic object segmentation server system 110 supports the object segmentation system 106 on the client device 102. Indeed, in one or more implementations, the server device 108 includes all, or a portion of, the object segmentation system 106. In particular, the object segmentation system 106 on the client device 102 downloads an application from the server device 108 (e.g., an image editing application from the image class-agnostic object segmentation server system 110) or a portion of a software application.

In some implementations, the image class-agnostic object segmentation server system 110 includes a web hosting application that allows the client device 102 to interact with content and services hosted on the server device 108. To illustrate, in one or more implementations, the client device 102 accesses a web page supported by the server device 108 hosting the models that returns one or more generated object masks for a digital image. As another example, the client device 102 (e.g., a mobile device) includes an image editing application that provides a digital image to the image class-agnostic object segmentation server system 110 on the server device 108, which provides back an object mask of the target object and/or automatically selects the target object (or target partial object) in the digital image.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2:
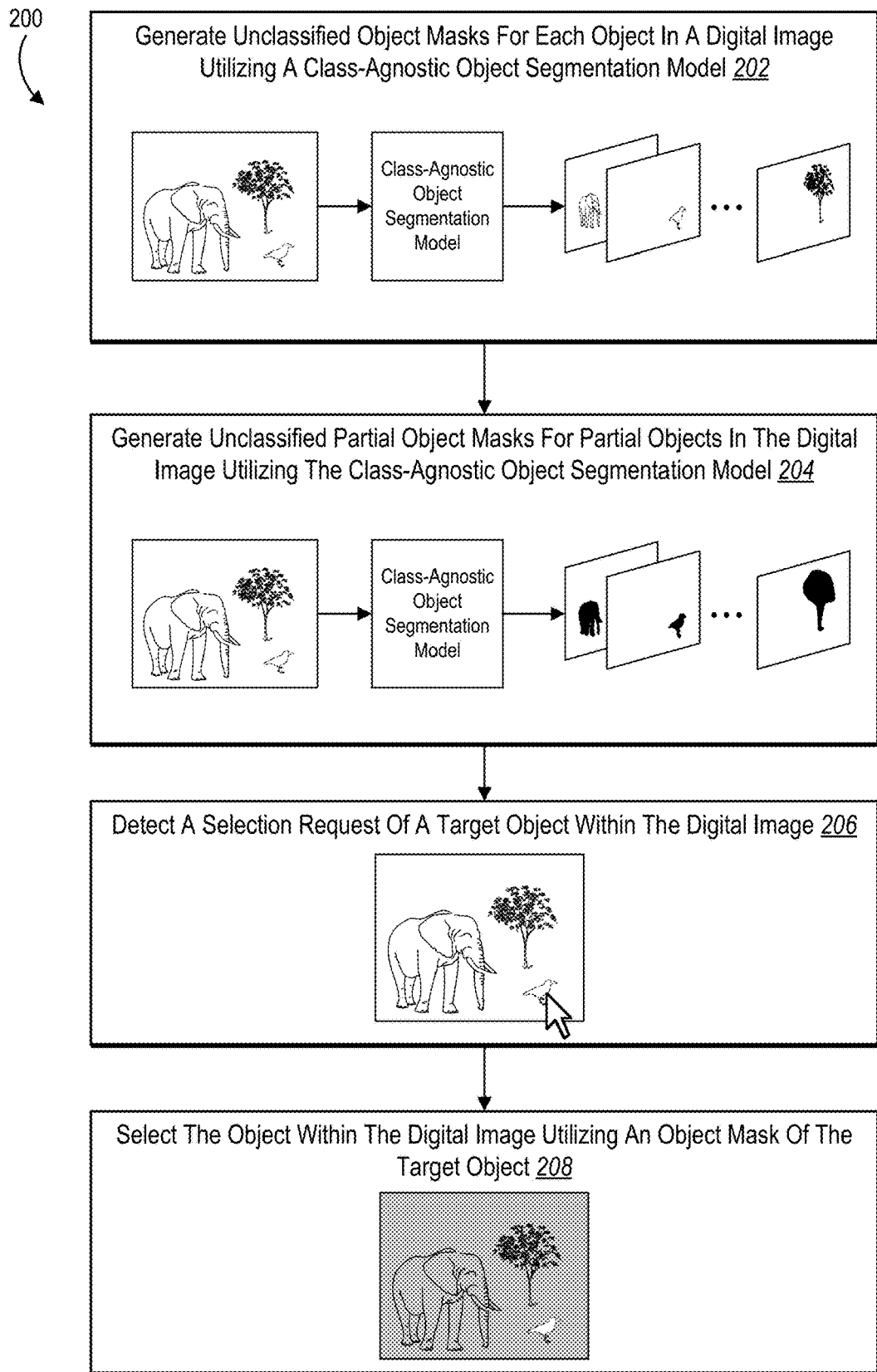
FIG. 2 illustrates an overview diagram of automatically selecting an unclassified object in a digital image in accordance with one or more implementations.

Turning to the next figure, FIG. 2 provides an overview of utilizing the object segmentation system 106 to automatically select objects in digital images. In particular, FIG. 2 illustrates a series of acts 200 of automatically selecting an object in a digital image without classifying the object in accordance with one or more implementations. For example, in various implementations, the object segmentation system 106 performs the series of acts 200. In some implementations, an image editing system and/or image editing application performs one or more of the acts included in the series of acts 200.

As shown in FIG. 2, the series of acts 200 includes an act 202 of generating unclassified object masks for each object in a digital image utilizing a class-agnostic object segmentation model. For example, upon identifying an image, the object segmentation system inferences the image via a class-agnostic object segmentation neural network that segments each object in the image without trying to classify each object. Further, the class-agnostic object segmentation model utilizes the segmentations to generate an object mask for each object. Additional detail regarding utilizing class-agnostic object segmentation models to generate object masks for objects is described below with respect to FIG. 3B.

In various implementations, the object segmentation system generates one or more class-agnostic object segmentation models. For example, in one or more implementations, the object segmentation system learns parameters for a class-agnostic object segmentation neural network to segment all objects in digital images without classifying the segmented objects. Additional detail regarding learning parameters for class-agnostic object segmentation models is described below with respect to FIG. 3A.

As shown, the series of acts 200 includes an act 204 of generating unclassified partial object masks for partial objects in the digital image utilizing the class-agnostic object segmentation model. For example, the object segmentation system also segments partial objects within the digital image utilizing the class-agnostic object segmentation model. In one or more implementations, the object segmentation system utilizes the same class-agnostic object segmentation model to segment both object and partial objects. In alternative implementations, the object segmentation system utilizes a different instance of a class-agnostic object segmentation model to segment partial objects in the image. In addition, the object segmentation system 106 generates object masks for the partial objects. Additional detail regarding utilizing class-agnostic object segmentation models to segment parts is described below with respect to FIG. 4C.

As mentioned above, in some implementations, the object segmentation system further trains a class-agnostic object segmentation neural network to segment partial objects within digital images. Additional detail regarding training class-agnostic object segmentation models to segment partial objects is described below with respect to FIGS. 4A and 4B.

As shown, the series of acts 200 includes an act 206 of detecting a selection request of a target object within the digital image. For instance, a user clicks, hovers a mouse, or otherwise indicates a target object within the digital image. In response, the object segmentation system 106 detects a location within the digital image where the user indicates the target object to be selected. In some implementations, the object segmentation system is integrated into an image editing application that displays the digital image and facilitates user interaction.

As shown, the series of acts 200 includes an act 208 of selecting the object within the digital image. In some implementations, the object segmentation system 106 matches the location of the selection request with a generated object mask to identify the object mask for the target object. In one or more implementations, the object segmentation system 106 determines that the location of the selection request corresponds to a partial object. In these implementations, the object segmentation system 106 selects the partial object utilizing an object mask generated for the corresponding partial object. Additional examples of selecting target objects and target partial objects are described below with respect to FIGS. 6A-6D.

Figure 3A:
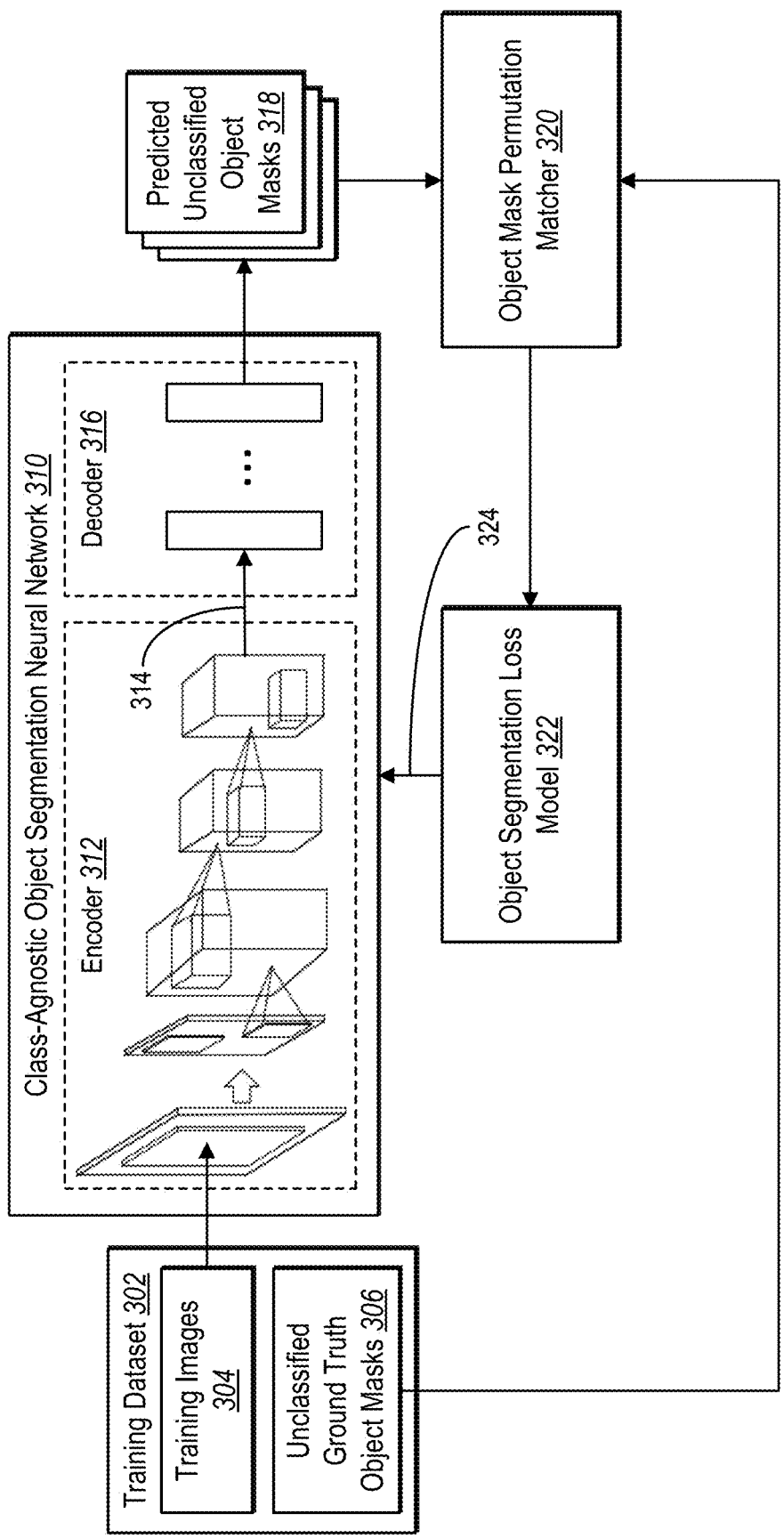
FIGS. 3A-3B illustrate block diagrams of training and utilizing a class-agnostic object segmentation neural network to generate object masks for objects in a digital image without semantically classifying objects in accordance with one or more implementations.
Figure 3B:
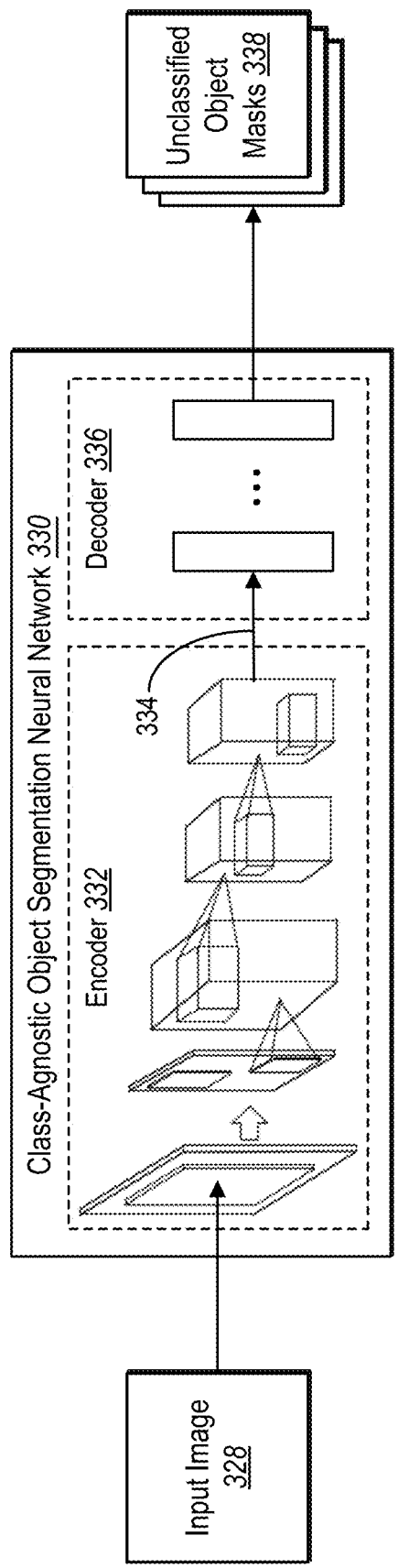

Advancing to the next set of figures, FIGS. 3A-3B provide examples of class-agnostic object segmentation models utilized by the object segmentation system 106. In particular, FIGS. 3A-3B illustrate block diagrams of training (FIG. 3A) and utilizing (FIG. 3B) a class-agnostic object segmentation neural network to generate object masks for objects in a digital image without semantically classifying objects in accordance with one or more implementations. In various implementations, the class-agnostic object segmentation model illustrated in FIGS. 3A-3B are implemented by the object segmentation system 106 on a client device and/or a server device.

As shown, FIG. 3A includes a training dataset 302, a class-agnostic object segmentation neural network 310, predicted unclassified object masks 318, an object mask permutation matcher 320, and an object segmentation loss model 322. The training dataset 302 includes training images 304 and a set of corresponding unclassified ground truth object masks 306 (i.e., unlabeled or class-agnostic ground truth object masks). For example, for each image in the training images 304 containing objects, the training dataset 302 includes a set of unclassified ground truth object masks 306 corresponding to the objects within the image. Indeed, in various implementations, each pixel in each of the training images 304 is assigned to an object mask. Notably, unlike most object detection conventional systems, the training dataset 302 need not include classification or labeled data for objects.

As shown, FIG. 3A includes the class-agnostic object segmentation neural network 310 (or simply "class-agnostic segmentation network 310"). In various implementations, the class-agnostic segmentation network 310 is a convolutional neural network (CNN) that includes several neural network layers. For example, in one or more implementations, the class-agnostic segmentation network 310 includes lower neural network layers that form an encoder 312. In addition, the class-agnostic segmentation network 310 includes higher neural network layers that form a decoder 316.

By way of context, machine-learning models include algorithms that model high-level abstractions in data by generating data-driven predictions or decisions from the known input data. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), or decision tree models.

Further, a neural network includes a machine learning model having interconnected artificial neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using training data to tune parameters of the neural network. Examples of neural networks include a convolutional neural network (CNN), residual learning neural network, recurrent neural network (RNN), generative adversarial neural network (GAN), and single-shot detect (SSD) networks.

As shown and mentioned above, the class-agnostic segmentation network 310 includes the encoder 312. In various implementations, the encoder 312 encodes input images into latent object feature maps or latent object feature vectors 314 (or simply "feature vectors 314"). For example, in one or more implementations, the encoder 312 processes each input image through various neural network layers (e.g., convolutional, ReLU, and/or pooling layers) to encode pixel data from the input images into a feature vector 314 (e.g., a string of number in vector space representing the encoded image data).

As shown, the class-agnostic segmentation network 310 includes higher neural network layers that form a decoder 316. In one or more implementations, the higher neural network layers include fully connected layers, segmentation, and/or classification (e.g., SoftMax) layers. In various implementations, the decoder 316 processes the feature vectors 314 to generate pixel segmentations for each detected object in an input image. For example, the decoder 316 generates the predicted unclassified object masks 318 from the feature vector 314 (e.g., using a SoftMax classifier) and/or generates an object segmentation for each object in an input image, from which the predicted unclassified object masks 318 (e.g., predicted unlabeled or unclassified class-agnostic object masks) are created.

In various implementations, the decoder 316 includes multiple output channels. For example, the decoder 316 includes an output channel for each object segmentation and/or object mask being created in an input image. Accordingly, in these implementations, the decoder 316 utilizes each output channel to determine a different segment from the feature vector 314 and output a corresponding object mask (e.g., the predicted unclassified object masks 318).

In a number of implementations, the output channels are deemed as a set. In these implementations, the output channels are permutation-invariant meaning that the order of the outputted predicted unclassified object masks 318 is immaterial. In some implementations, the decoder 316 includes 80-100 output channels. However, in alternative implementations, the decoder 316 includes additional (for more granularity) or fewer channels (for reduced processing) depending on the number of objects anticipated to be included in a digital image.

As mentioned, the decoder 316 (i.e., of the class-agnostic segmentation network 310) generates the predicted unclassified object masks 318. In particular, the class-agnostic segmentation network 310 encodes and decodes input images irrespective of semantic classification. Indeed, unlike conventional object detection systems, the class-agnostic segmentation network 310 learns to segment pixels in an input image without identifying the pixels as belonging to a particular object classification type. As a result, the predicted unclassified object masks 318 have no classification labels or are labeled as unknown or unclassified.

Because the object segmentation system 106 generates the predicted unclassified object masks 318 irrespective of semantic classification, the object segmentation system learns parameters for the class-agnostic segmentation network 310 in an unconventional manner. For example, conventional systems utilize supervised learning to match predicted object classifications (e.g., labels) with corresponding ground truth classifications at an object detection loss model to train an object detection neural network. However, because the predicted unclassified object masks 318 are not labeled (as well as the unclassified ground truth object masks 306), the object segmentation system 106 utilizes an alternative approach to train the class-agnostic segmentation network 310.

To illustrate, before employing the object segmentation loss model 322, the object segmentation system 106 utilizes the object mask permutation matcher 320 to determine which unclassified ground truth object masks 306 correspond to which predicted unclassified object masks 318. For example, because a large number of pairings or permutation exist between the unclassified ground truth object masks 306 and the predicted unclassified object masks 318 for each input image, the object mask permutation matcher 320 determines an optimal pairing between the predicted unclassified object masks 318 and unclassified ground truth object masks 306 corresponding to the input image.

To determine the optimal pairing mentioned above, in various implementations, the object mask permutation matcher 320 matches the predicted unclassified object masks 318 with the unclassified ground truth object masks 306. More particularly, in one or more implementations, the object mask permutation matcher 320 determines a permutation (e.g., arrangement or combinations) that maximizes overlap between the predicted unclassified object masks 318 to the unclassified ground truth object masks 306 from the training dataset 302. For example, the object mask permutation matcher 320 compares many one-to-one combinations between each of the object mask permutation matcher 320 with the predicted unclassified object masks 318. At each permutation, the object mask permutation matcher 320 measures the pixel overlap between the two sets. Upon running through multiple permutations, the object mask permutation matcher 320 determines which permutation has the most overlap (e.g., measuring edge pixels or total segmented pixels) and provides that permutation to the object segmentation loss model 322.

In various implementations, the object mask permutation matcher 320 utilizes one or more algorithms for determining the optimal overlap between the predicted unclassified object masks 318 and the unclassified ground truth object masks (i.e., object masks). For instance, in some implementations, the object mask permutation matcher 320 utilizes a combinational optimization algorithm (e.g., a matching algorithm) that compares permutations of different match combinations between the predicted unclassified object masks and the unclassified ground truth object masks corresponding to the same image.

In one or more implementations, the object segmentation system 106 utilizes the matching formulation shown below in Equation 1.

$$\hat{\sigma} = \operatorname*{argmin}_{\sigma \in \mathfrak{S}_N} \sum_i \mathcal{L}_{match}(y_i, \hat{y}_{\sigma(i)}) \quad (1)$$

As shown in Equation 1, $\hat{\sigma}$ refers to an optimal permutation out of N permutations, $y_i$ refers to the predicted unclassified object masks 318, and $\hat{y}_{\sigma(i)}$ refers to unclassified ground truth object masks 306. Accordingly, the object segmentation system 106 utilizes Equation 1 to determine matches between different combinations (i.e., permutations) of the predicted unclassified object masks 318 (i.e., $y_i$) and the unclassified ground truth object masks 306 (i.e., $\hat{y}_{\sigma(i)}$). For each match, the object segmentation system 106 utilizes Equation 1 to aggregate the difference between the overlapping masks for each combination of predicted unclassified object masks 318 and unclassified ground truth object masks 306. Further, the object segmentation system 106 utilizes Equation 1 to determine the permutation (i.e., σ) out of all permutations (i.e., N) that has the smallest (e.g., minimum) total differential pixel distance (e.g., the maximum pixel overlap equivalence) to identify the optimal permutation (i.e., $\hat{\sigma}$). For example, in various implementations, the object segmentation system 106 utilizes the Hungarian algorithm or another combinational optimization algorithm to determine the optimal permutation (i.e., $\hat{\sigma}$).

In various implementations, the object segmentation system 106 utilizes an object detection similarity measure for determining the pixel overlap difference between each combination of predicted unclassified object masks 318 and unclassified ground truth object masks 306. To illustrate, Equation 2 shows an example formulation.

$$\mathcal{L}_{match}(y_i, y_j) = \text{IoU}(y_i, y_j) \quad (2)$$

As shown, Equation 2 includes an intersection over union (IoU) algorithm that compares the predicted unclassified object masks 318 to the unclassified ground truth object masks 306 for each image. For example, for each permutation that includes the predicted unclassified object masks 318 for an input image and a corresponding number of paired unclassified ground truth object masks 306, the object segmentation system 106 utilizes Equation 2 to measure the area of overlap between each predicted object masks and its paired unclassified ground truth object mask. Further, the object segmentation system 106 utilizes Equation 2 to measure the total area (e.g., pixels) covered by both masks. Then, the object segmentation system 106 utilizes Equation 2 to determine the IoU for each predicted object mask by dividing the total area covered between the two masks and the area of overlap between the two masks.

In various implementations, the object segmentation system 106 utilizes Equation 2 in connection with Equation 1. That is, the object segmentation system 106 utilizes the IoU matching measurement of Equation 2 to determine that the pixel overlap difference between each object mask pair in a permutation, then aggerates the overlap difference for all pairs in a permutation as shown in Equation 1. Further, as described above, the object segmentation system 106 utilizes Equation 1 to then determine the permutation (i.e., σ) out of all permutations (i.e., N) that has the smallest (e.g., minimum) total pixel overlap difference (e.g., the maximum pixel overlap equivalence).

In various implementations, the object segmentation system 106 determines the object detection similarity measure (e.g., IoU) for multiple pairings between predicted unclassified object masks 318 and unclassified ground truth object masks 306 in parallel. For example, the object segmentation system 106 utilizes parallel processing in one or more graphics processing units (GPUs) to improve efficiency when determining the total overlap difference for each permutation and/or for multiple permutations at the same time. In this manner, the object segmentation system 106 reduces or minimizes the overhead of determining the pixel overlap difference for each permutation.

As shown, FIG. 3A includes the object segmentation loss model 322. For example, the object segmentation system 106 utilizes the optimal permutation pairing between the predicted unclassified object masks 318 and the unclassified ground truth object masks 306 determined using object mask permutation matcher 320 with the segmentation loss model 322. While the object segmentation loss model 322 is shown as a separate component from the object segmentation loss model 322, in some implementations, the object segmentation loss model 322 and the object segmentation loss model 322 are combined into a single loss.

In various implementations, the object segmentation system 106 utilizes the object segmentation loss model 322 to determine a segmentation loss metric 324 between the predicted unclassified object masks 318 and the unclassified ground truth object masks 306 for the optimal permutation. In one or more implementations, the object segmentation system 106 utilizes the object segmentation loss model 322 to determine the segmentation loss metric 324 by minimizing distances between the predicted unclassified object masks 318 and the unclassified ground truth object masks 306. For example, in some implementations, the object segmentation system 106 utilizes a dice loss function (rather than cross-entropy) to minimize the distances between the predicted unclassified object masks 318 and the unclassified ground truth object masks 306 while controlling for data imbalances between positive and negative samples.

One example of a dice loss function is shown in Equations 3 and 4 below, where p and q refer to the predicted unclassified object masks and the unclassified ground truth object masks.

$$\mathcal{L}_{Dice} = 1 - D(p, q) \quad (3)$$

$$D(p, q) = \frac{2 \sum_{x,y} (p_{x,y}, q_{x,y})}{\sum_{x,y} p_{x,y}^2 + \sum_{x,y} q_{x,y}^2} \quad (4)$$

In various implementations, the object segmentation system 106 utilizes the segmentation loss metric 324 to learn parameters for the class-agnostic segmentation network 310. To illustrate, in one or more implementations, the object segmentation system 106 utilizes the segmentation loss metric 324 to train and optimize the neural network layers of the class-agnostic segmentation network 310 via backpropagation and/or end-to-end learning. For example, the object segmentation system 106 back propagates the recommendation loss to tune the neural network layers of the encoder 312 and the decoder 316. In this manner, the object segmentation system 106 can iteratively tune and train the class-agnostic segmentation network 310 to learn a set of best-fit parameters that accurately generates the predicted unclassified object masks 318.

Once trained, in various implementations, the object segmentation system 106 utilizes the class-agnostic segmentation network 310 to inference object masks for unclassified objects in input images (e.g., query images). To illustrate, FIG. 3B shows a trained class-agnostic object segmentation neural network 330 (or simply "class-agnostic segmentation network 330"). As shown, FIG. 3B includes an input image 328, the class-agnostic segmentation network 330 having an encoder 332, a decoder 336, and unclassified object masks 338.

In one or more implementations, the object segmentation system 106 provides the input image 328 to the class-agnostic segmentation network 330. In these implementations, the class-agnostic segmentation network 330 utilizes the encoder 332 to generate a latent object feature map or latent object feature vector 334 (or simply "feature vector 334") that encodes pixels of the input image 328 into a learned latent vector space. The class-agnostic segmentation network 330 then utilizes the decoder 336 to decode the feature vector 334 and generate the unclassified object masks 338 (i.e., unlabeled or class-agnostic object masks).

As mentioned above, in various implementations, the unclassified object masks 338 includes an unclassified object mask for each object located in the input image 328. Indeed, each pixel in the input image 328 is assigned to an unclassified object mask 338. Further, as mentioned above, because the class-agnostic segmentation network 330 is class-agnostic, the unclassified object masks 338 are either unlabeled (e.g., have no assigned classification) or are assigned a label of "null," "unclassified," or "unknown."

Figure 4A:
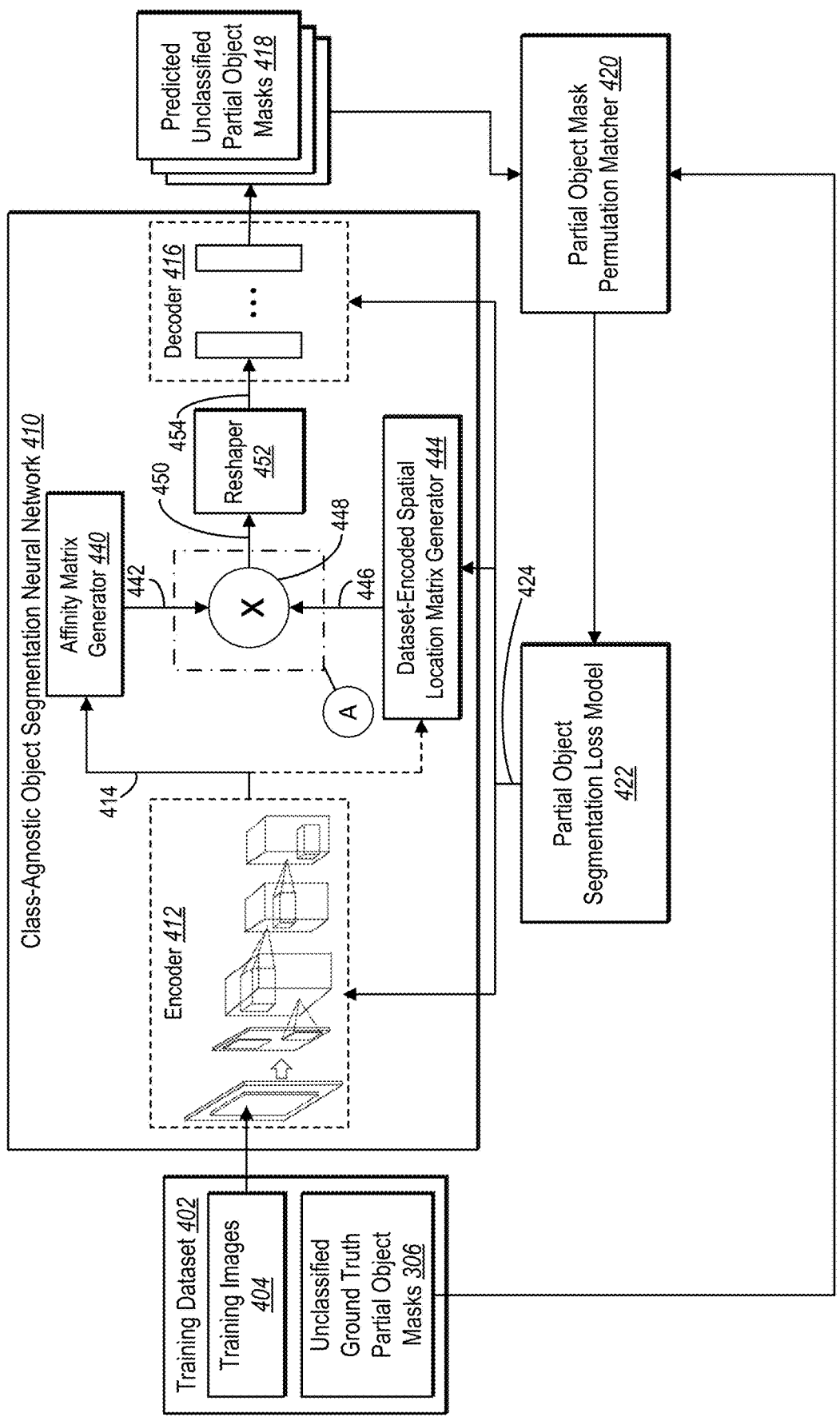
FIGS. 4A-4C illustrate block diagrams of training and utilizing a class-agnostic object segmentation neural network to generate object masks for partial objects in a digital image in accordance with one or more implementations.
Figure 4B:
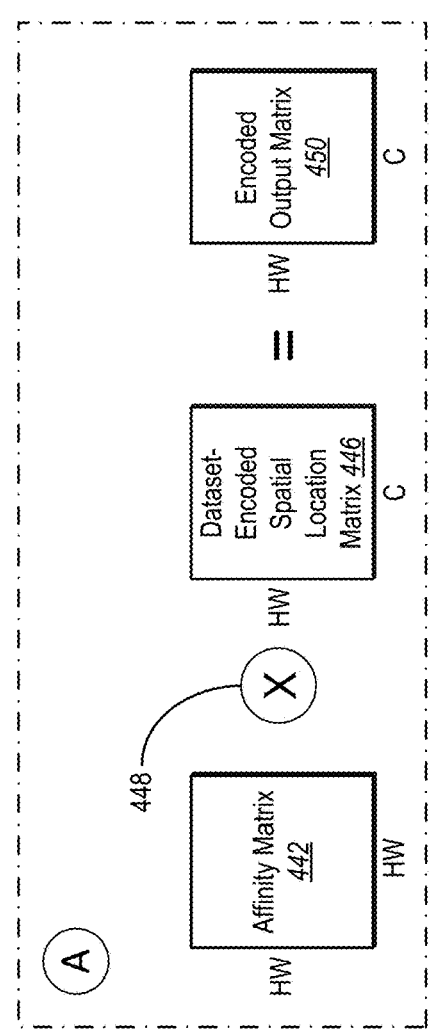
Figure 4C:
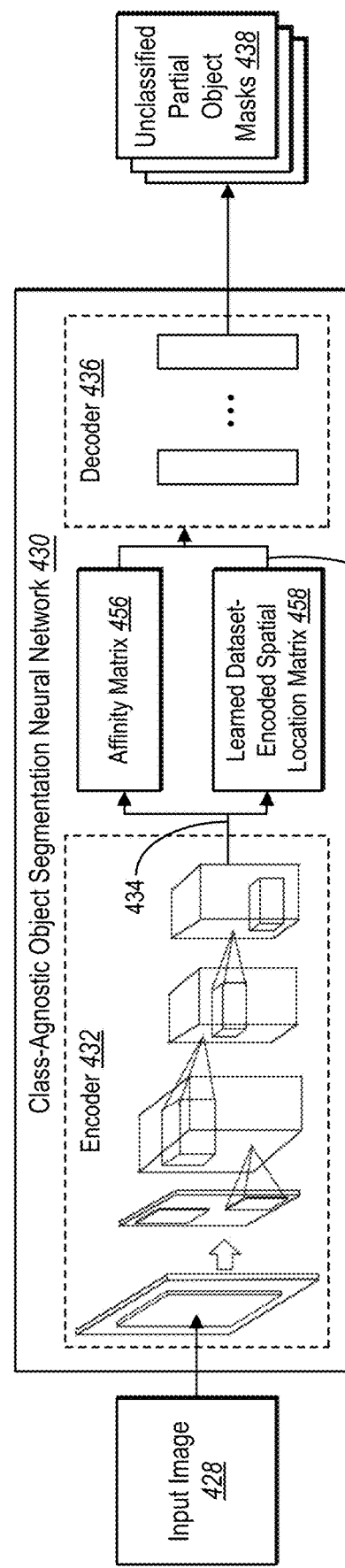

Moving on, FIGS. 4A-4C provide additional examples of class-agnostic object segmentation models utilized by the object segmentation system 106. In particular, FIG. 4A illustrates a class-agnostic object segmentation neural network 410 that generates unclassified partial object masks and FIG. 4B illustrates an enlargement of a portion of the class-agnostic object segmentation neural network 410. Further, FIG. 4C illustrates implementing a class-agnostic object segmentation neural network 430 to generate unclassified partial object masks for an input image.

As shown, FIG. 4A includes a training dataset 402, a class-agnostic object segmentation neural network 410 (or simply "class-agnostic segmentation network 410"), predicted unclassified partial object masks 418, a partial object mask permutation matcher 420, and a partial object segmentation loss model 422. For instance, in various implementations, the training dataset 402 includes training images 404 and a set of corresponding unclassified ground truth partial object masks 406 (i.e., class-agnostic ground truth partial object masks). In a similar manner, as described above, each image in the training images 404 includes partial objects of an object and unclassified ground truth partial object masks 406 corresponding to partial objects within the image. Additionally, as with the class-agnostic segmentation network 310 described above in FIG. 3A, the training dataset 402 need not include classification or labeled data for partial objects.

In various implementations, the class-agnostic segmentation network 410 in FIG. 4A is an enhanced version of the class-agnostic segmentation network 310 described above with respect to FIG. 3A. For example, the class-agnostic segmentation network 410 generates object masks for both objects and partial objects. In some implementations, the class-agnostic segmentation network 410 in FIG. 4A is a separate version instance of the class-agnostic segmentation network 310 described above with respect to FIG. 3A. For instance, the class-agnostic segmentation network 310 generates unclassified object masks while the class-agnostic segmentation network 410 generates unclassified partial object masks (e.g., unclassified object masks for partial objects).

As shown, FIG. 4A includes the class-agnostic segmentation network 410 having an encoder 412 and a decoder 416, which are similar to corresponding components described above with respect to FIG. 3A. In addition, the class-agnostic segmentation network 410 includes an affinity matrix generator 440, a dataset-encoded spatial location matrix generator 444, a combiner 448, and a reshaper 452. Indeed, the class-agnostic segmentation network 410 includes additional elements over the class-agnostic segmentation network 310 described above to facilitate detecting unclassified partial objects within images.

In various implementations, the object segmentation system 106 provides the training images 404 to the class-agnostic segmentation network 410. As described above, the class-agnostic segmentation network 410 utilizes the encoder 412 to generate latent object feature maps or latent object feature vectors 414 (or simply "feature vectors 414").

As mentioned above, in various implementations, the feature vectors 414 include encoded pixel data from the training images 404 corresponding to a latent vector space.

As shown, the class-agnostic segmentation network 410 includes providing the feature vector 414 to the affinity matrix generator 440. In various implementations, the affinity matrix generator 440 creates an affinity matrix 442 from the feature vector of an input image. For example, in one or more implementations, the affinity matrix generator 440 generates an affinity matrix 442 for an input image by comparing each encoded feature in the feature vector 414 with each other encoded feature to determine encoded feature similarities between each pixel of the feature vector 414. In example implementations, the affinity matrix 442 measures the similarity of the features at a given location with features at all other locations in the input image.

In some implementations, the affinity matrix generator 440 utilizes a dot product to generate the affinity matrix 442 from the feature vector 414. In alternative implementations, the affinity matrix generator 440 utilizes another formulation (e.g., taking an exponential and subtracting the feature vector different square) to measure the affinity between any two encoded pixels of the input image. In some implementations, the affinity matrix 442 indicates similarities between RGB XY values of each pixel in an input image. Additional detail regarding the affinity matrix 442 is provided below with respect to FIG. 4B, which further describes the elements and components within Box A of the class-agnostic segmentation network 410.

As also shown, the class-agnostic segmentation network 410 includes providing the feature vector 414 to a dataset-encoded spatial location matrix generator 444. In various implementations, the dataset-encoded spatial location matrix generator 444 generates a dataset-encoded spatial location matrix 446 (e.g., a constant matrix) that uniquely encodes each location in the dataset-encoded spatial location matrix across the set of training images 404 in the training dataset 402. In one or more implementations, while the affinity matrix 442 is generated for each given input image, the dataset-encoded spatial location matrix 446 is learned and refined based on the set of the training images 404. Further, in a number of implementations, the dataset-encoded spatial location matrix 446 remains constant after training.

In some implementations, the object segmentation system 106 utilizes a dataset-encoded spatial location vector rather than the dataset-encoded spatial location matrix 446 (e.g., the matrix has a single row or column). To illustrate, in one or more implementations, a dataset-encoded spatial location vector includes a row for each pixel in an input image and a corresponding encoded location value (e.g., one column). In alternative implementations, the dataset-encoded spatial location matrix 446 includes a row for each pixel in an input image and multiple columns (e.g., 256 columns).

In various implementations, the dataset-encoded spatial location matrix 446 learns the location bias in the training dataset 402. For example, in one or more implementations, the dataset-encoded spatial location matrix generator 444 encodes a first location bias for a given pixel in the dataset-encoded spatial location matrix 446 based on a first image of the training images 404. In addition, the dataset-encoded spatial location matrix generator 444 encodes a second location bias for the given pixel in the dataset-encoded spatial location matrix 446 based on a second image of the training images 404. In these implementations, for each image in the training images 404, the dataset-encoded spatial location matrix generator 444 continues encoding the given pixel with location biases. In some implementations, the dataset-encoded spatial location matrix generator 444 aggregates, averages, and/or otherwise combines each of the location biases for the given pixel across the training images 404. Additional detail regarding the dataset-encoded spatial location matrix 446 is provided below with respect to FIG. 4B.

As shown in FIG. 4A, the class-agnostic segmentation network 410 includes applying the affinity matrix 442 to the dataset-encoded spatial location matrix 446. For example, as illustrated, the combiner 448 joins the affinity matrix 442 with the dataset-encoded spatial location matrix 446 to generate an encoded output matrix 450. Additional detail regarding the encoded output matrix 450 is provided below with respect to FIG. 4B.

FIG. 4A also shows that the class-agnostic segmentation network 410 includes the reshaper 452. In various implementations, the reshaper 452 transforms the encoded output matrix 450 into the same dimensions as the feature vector 414. To illustrate, when the feature vector 414 is converted into the affinity matrix 442, the dimensions change from a first dimension to a second dimension (e.g., depending on the size of the dataset-encoded spatial location matrix 446). Further, when the affinity matrix 442 is applied to the dataset-encoded spatial location matrix 446, in various implementations, the resulting encoded output matrix 450 changes to a second dimension. Accordingly, the reshaper 452 converts the encoded output matrix 450 back to a modified feature vector 454 having the first dimension. In this manner, the decoder 416 is better able to process the modified feature vector 454.

In various implementations, the decoder 416 processes the modified feature vector 454 to generate the predicted unclassified partial object masks 418. For example, as described above, in one or more implementations, the decoder 416 utilizes a set of output channels to segment partial objects from the modified feature vector 454 to generate the predicted unclassified partial object masks 418 (i.e., predicted unlabeled or class-agnostic partial object masks) for an input image. Because the modified feature vector 454 includes highly-granular location similarity data (e.g., incorporated from applying the affinity matrix 442 and the dataset-encoded spatial location matrix 446), the decoder 416 is able to efficiently and accurately detect partial objects within digital images rather than only objects. For instance, in various implementations, each output channel in the decoder 416 is trained to identify a different object and/or partial object segmentation in the input image.

FIG. 4A also includes the partial object mask permutation matcher 420 and the partial object segmentation loss model 422. In various implementations, these components operate similarly to the corresponding components described above with respect to FIG. 3A (e.g., the object mask permutation matcher 320 and the object segmentation loss model 322). For example, the partial object mask permutation matcher 420 determines a permutation that achieves the largest overlap between a set of predicted unclassified partial object masks 418 for each of the training images 404 and corresponding sets of unclassified ground truth partial object masks 406. As described above, in various implementations, the partial object mask permutation matcher 420 utilizes a combinational optimization algorithm, such as a Hungarian algorithm, to determine the optimal matching permutation for each image.

Additionally, in various implementations, the object segmentation system 106 utilizes the partial object segmentation loss model 422 to determine a loss metric 424 by comparing the predicted unclassified partial object masks 418 and the unclassified ground truth partial object masks 406, as described above with respect to FIG. 3A. In one or more implementations, the partial object segmentation loss model 422 comprises a dice loss function. In alternative implementations, the partial object segmentation loss model 422 comprises a focal loss function or a binary cross-entropy function.

In various implementations, the object segmentation system 106 trains the dataset-encoded spatial location matrix 446 across the training dataset 402 based on the loss metric 424, as described above. Accordingly, in one or more implementations, the object segmentation system 106 back-propagates the loss metric 424 to the encoder 412, the decoder 416, and the dataset-encoded spatial location matrix 446 (e.g., via the dataset-encoded spatial location matrix generator 444 in some instances). For example, the dataset-encoded spatial location matrix 446 is randomly initialized and learned in training. In this manner, the object segmentation system 106 tunes the dataset-encoded spatial location matrix 446 to encode location biases for each pixel across a dataset.

As mentioned above FIG. 4B provides additional detail with respect to affinity matrices, the dataset-encoded spatial location matrix 446, the encoded output matrices. In particular, FIG. 4B is an enlargement of a portion of FIG. 4A. As shown, FIG. 4B includes the affinity matrix 442, the dataset-encoded spatial location matrix 446, and the encoded output matrix 450 described above with respect to the class-agnostic segmentation network 410.

In various implementations, the object segmentation system 106 generates the affinity matrix 442 for an input image based on a feature vector 414 of the input image, as disclosed previously. As shown, the affinity matrix 442 has the dimensions of HW×HW, where HW corresponds to the height H of an image (in pixels) times the width W of the image (in pixels) to represent the pixels in the image.

As described above, the affinity matrix 442 includes a similarity measurement of the deeply learned features at a given location with deeply learned features at all other locations in the input image. For example, in various implementations, the affinity matrix 442 includes a similarity value determined by comparing every location in the feature map with every other location in the feature map. To illustrate, in one or more implementations, the similarity values range from 0-1, where 0 indicates no similarity (e.g., beyond a first threshold distance between the two encoded pixels in vector space) and 1 indicates perfect similarity (e.g., within a second threshold distance between the two encoded pixels in vector space). Indeed, a pixel has a similarity value of 1 with itself. The range may be linear, logarithmic, or based on another metric. In alternative implementations, the similarity values correspond to a different range.

As shown, FIG. 4B includes the dataset-encoded spatial location matrix 446. In one or more implementations, the dimensions of the dataset-encoded spatial location matrix 446 are HW (e.g., the combination of the pixels in an input image) and C (e.g., a parameter that represents one or more channels in some implementations). As noted above, the dataset-encoded spatial location matrix 446 learns encoded location bias information for each pixel based on all of the training images 404 in the training dataset 402. For example, each row in the dataset-encoded spatial location matrix 446 includes a unique encoding for each pixel location. In addition, because the dataset-encoded spatial location matrix 446 is encoded across multiple images, the object segmen-tation system 106 is able to train the dataset-encoded spatial location matrix 446 to segment pixels at the partial-object level with less ground truth data than needed by conventional systems to train an object detection neural network. This improves efficiency and flexibility of operation as less data, as well as more generic data, can be used to train the class-agnostic segmentation network.

Further, as mentioned above, the dataset-encoded spatial location matrix 446 includes a unique bias determined for each pixel location. As a result, in various implementations, the object segmentation system 106 leverages this location information to determine pixel groupings within an input image that share high-level semantic similarities. In this manner, the object segmentation system 106 is able to accurately and efficiently determine partial object groupings (e.g., segments and/or object masks) without performing object classification. Further, in one or more implementations, the object segmentation system 106 utilizes the dataset-encoded spatial location matrix 446 to generalize multiple object categories and classifications to detect objects and partial objects. As a result, the object segmentation system 106 is able to flexibly identify objects and partial objects having categories and classifications not observed in the training images.

In various implementations, the object segmentation system 106 trains the dataset-encoded spatial location matrix 446 by combining, aggregating, and/or averaging basic encoded location information for each pixel across multiple images, as described above. In this manner, in various implementations, the dataset-encoded spatial location matrix 446 forms an overall prior encoding for each location, and the learned spatial prior is fixed upon completing training. Indeed, the dataset-encoded spatial location matrix 446 remains constant upon training, as opposed to adaptive feature matrices.

While the dataset-encoded spatial location matrix 446 is class-agnostic, in some implementations, the dataset-encoded spatial location matrix 446 indirectly encodes class information. For example, the dataset-encoded spatial location matrix 446 inherently encodes spatial location data indicating that pixels at the top of images are often similar to other pixels at the top of images if several of the training images include sky at the top of images.

As mentioned above, in various implementations, the object segmentation system 106 applies the affinity matrix 442 to the dataset-encoded spatial location matrix 446. In particular, as shown in FIG. 4B, the object segmentation system 106 utilizes the combiner 448 to combine, average, sum, and/or multiply the affinity matrix 442 with the dataset-encoded spatial location matrix 446 to generate the encoded output matrix 450, which has the dimensions of HW and C. In this manner, the object segmentation system 106 is able to determine the encoded output matrix 450 by applying the unique encodings learned for each location in the dataset-encoded spatial location matrix 446 to corresponding locations within an input-image-specific affinity matrix 442.

In various implementations, in applying the dataset-encoded spatial location matrix 446 to the affinity matrix 442 generated for an input image, the object segmentation system 106 generates the encoded output matrix 450 that indicates which pixels in the input image corresponding to each other at a high level of granularity or detail. Further, in example implementations, the object segmentation system 106 utilizes the encoded spatial information in the encoded output matrix 450 (e.g., reshaped into the modified feature vector 454 as described above) to decode and segment the input image based on objects and partial objects irrespective of object classifications.

In some implementations, the combiner 448 applies a non-local attention operation following the formulation of Y=AL, where Y represents the encoded output matrix 450, A represents the affinity matrix 442, and L represents the dataset-encoded spatial location matrix 446. Indeed, in some implementations, the object segmentation system 106 follows a non-local attention-based operation but 1) substitutes the semantic encoded feature vector (e.g., a vector that learns to encode a semantic object classification such as people or cars to images) with the class-agnostic, dataset-encoded spatial location matrix 446 and 2) modifies that training of the dataset-encoded spatial location matrix 446 to be across all images in a dataset. In this manner, the object segmentation system 106 utilizes a class-agnostic non-location operation that ignores semantic information and, instead, learns feature seminaries between pixels.

Once trained, in various implementations, the object segmentation system 106 utilizes the class-agnostic segmentation network 410 to inference object masks for unclassified partial objects on input images (e.g., query images). To illustrate, FIG. 4C shows a trained class-agnostic object segmentation neural network 430 (or simply "class-agnostic segmentation network 430"). As shown, FIG. 4C includes an input image 428, the class-agnostic segmentation network 430 having an encoder 432, an affinity matrix 456, a learned dataset-encoded spatial location matrix 458, a decoder 436, and unclassified partial object masks 438.

In one or more implementations, the object segmentation system 106 provides the input image 428 to the class-agnostic segmentation network 430. In these implementations, the trained class-agnostic segmentation network 430 utilizes the encoder 432 to generate a feature vector 434 that encodes pixels of the input image 428 into a learned latent vector space. Additionally, the trained class-agnostic segmentation network 430 generates the affinity matrix 456 from the feature vector 434, as described above, as well as applies the affinity matrix 456 to the learned dataset-encoded spatial location matrix 458 to generate the modified feature vector 460. The class-agnostic segmentation network 430 then utilizes the decoder 436 to decode the modified feature vector 460 and generate the unclassified partial object masks 438 (i.e., class-agnostic partial object masks).

As described above, the object segmentation system 106 generates class-agnostic object masks for objects and partial objects within images. In these implementations, the object segmentation system 106 provides no label, a null label, or unclassified label along with the object mask when selecting a target object. In some implementations, the object segmentation system 106 also provides a classification label for an automatically selected object. To illustrate, FIG. 5 shows a block diagram of a class-agnostic object segmentation neural network that includes an object classification model in accordance with one or more implementations.

Figure 5:
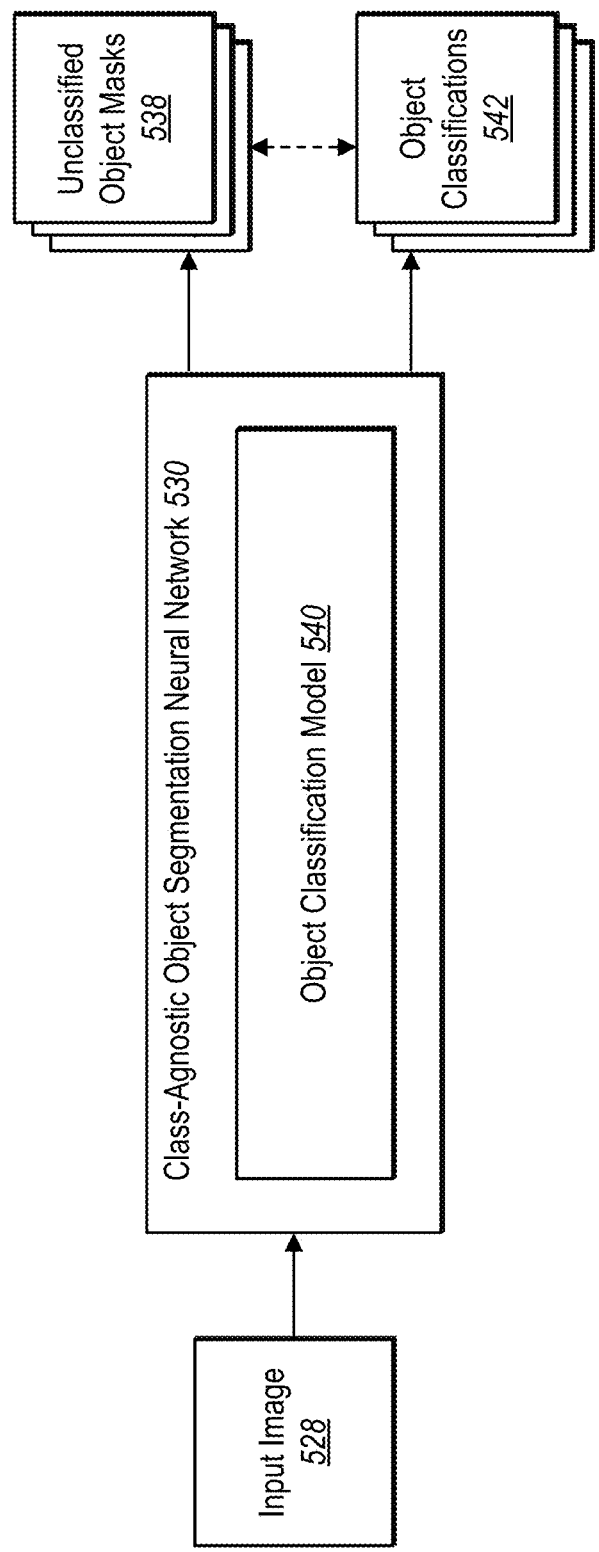
FIG. 5 illustrates a block diagram of a class-agnostic object segmentation neural network that includes an object classification model in accordance with one or more implementations.

As shown, FIG. 5 includes an input image 528, a class-agnostic object segmentation neural network 530 having an object classification model 540, unclassified object masks 538, and object classifications 542. Indeed, in some implementations, the object segmentation system 106 can add additional neural network layers and/or models to the class-agnostic segmentation network to enable additional functionality, such as providing classification labels for known objects.

To illustrate, in various implementations, the object classification model 540 recognizes one or more objects in the input image 528. For example, the object classification model 540 determines whether one of the unclassified object masks 538 includes a known object. The object segmentation system 106 may utilize the techniques and approaches found in U.S. patent application Ser. No. 16/518,810, "Automatically Detecting User-Requested Objects In Images," filed on Jul. 22, 2019, the entirety of which is incorporated herein by reference. In this manner, the object segmentation system 106 provides unclassified object masks for all objects in the input image 528, which includes both known and unknown objects, as well as classification labels corresponding to the known objects (e.g., corresponding to a subset of the unclassified detected objects).

Turning now to FIGS. 6A-6D, various graphical examples of the object segmentation system 106 automatically selecting a target object or a partial target object are described. For instance, FIGS. 6A-6D illustrate a graphical user interface of automatically selecting an object or partial object in accordance with one or more implementations.

As shown, FIGS. 6A-6D illustrate a client device 600 having a graphical user interface 602 that includes an image 604 (i.e., a digital image). In various implementations, the client device 600 represents the client device 102 introduced above with respect to FIG. 1. As illustrated, the client device 600 includes an image editing application that implements the image editing system 104, which utilizes the object segmentation system 106. Also, in some implementations, the object segmentation system 106, or optionally the image editing application, generates the graphical user interface 602 in FIGS. 6A-6D.

In various implementations, the image editing application facilitates user interaction with the image 604. For example, the image editing application and/or the object segmentation system 106 provides a selection tool (e.g., an automatic object selection tool or a magic object selection tool) that enables the user to provide an object selection request. In response to detecting an object selection request with respect to a target object, the object segmentation system 106 automatically selects the target object.

Figure 6A:
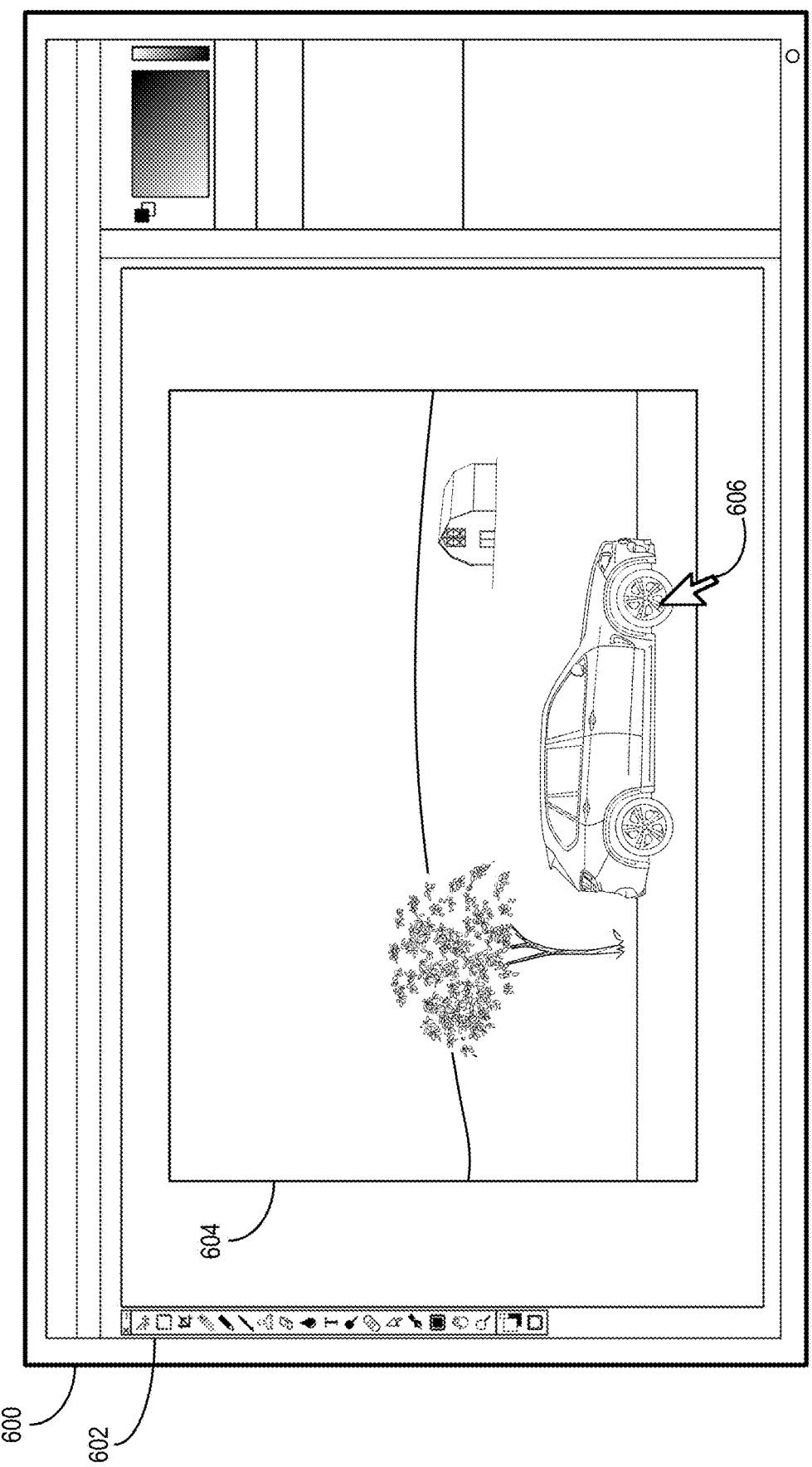
FIGS. 6A-6D illustrate a graphical user interface of automatically selecting an object or partial object in accordance with one or more implementations.

To illustrate, FIG. 6A shows a pointer 606 (e.g., a mouse) that is controlled by a user on the client device 600. Using the pointer 606, the user selects a target object. For instance, the user hovers or clicks the pointer 606 on a target object. While FIGS. 6A-6D include a pointer 606, the image editing application and/or object segmentation system 106 is able to detect other forms of user input, such as touch input on a touchscreen of the client device 600 or input from another device paired to the client device 600.

In response to detecting the selection request based on the user interaction, in one or more implementations, the object segmentation system 106 automatically selects the target object. For example, the object segmentation system 106 provides the image 604 to a class-agnostic object segmentation model, as described above, to generate unclassified object masks for each object in the image 604. Then, in response to detecting the selection request, in various implementations, the object segmentation system 106 utilizes the location of the pointer 606 to identify the unclassified object mask that corresponds to the target object. Further, the object segmentation system 106 utilizes the identified unclassified object mask to select the target object.

Figure 6B:
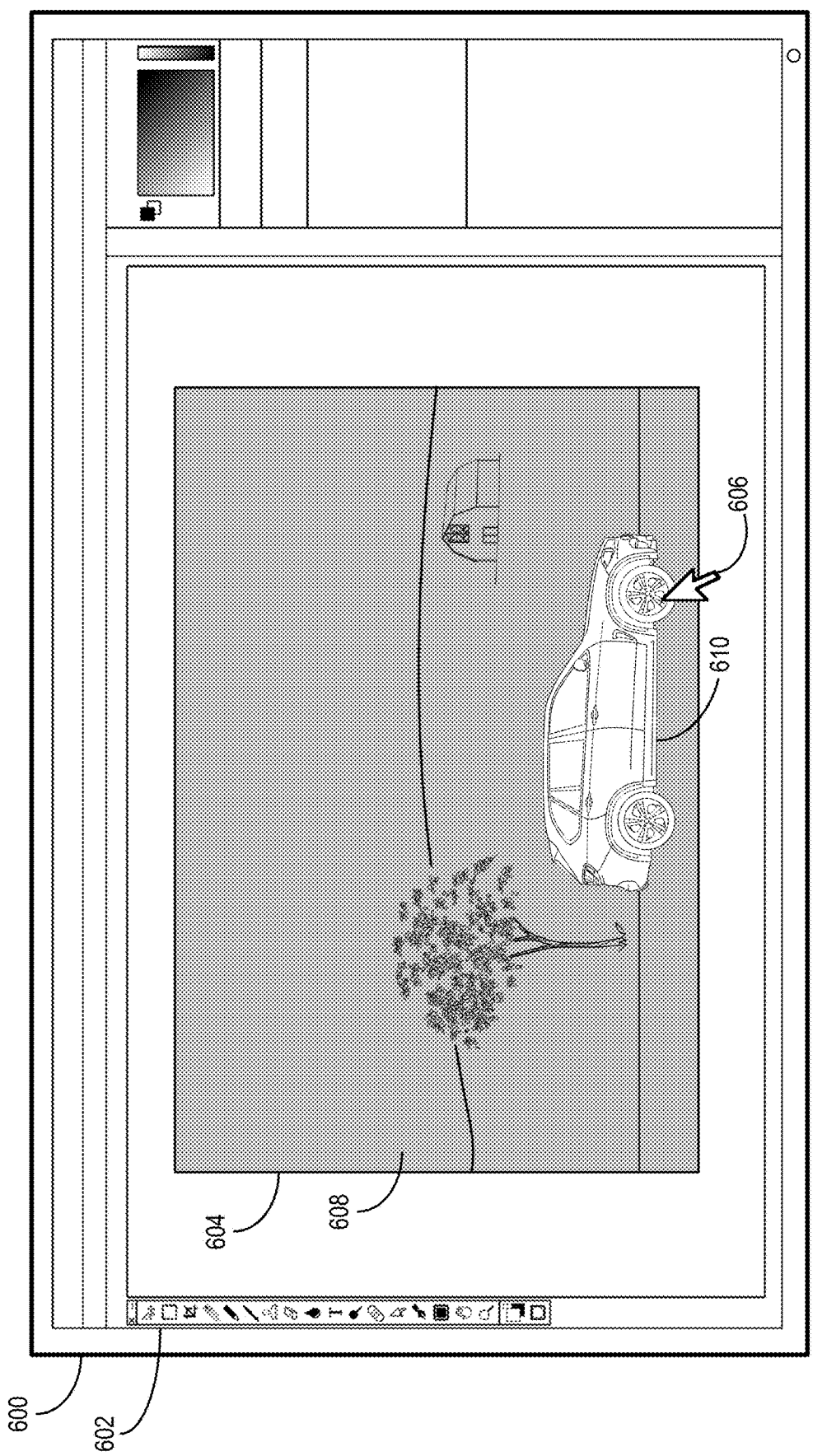

To illustrate, FIG. 6B shows the object segmentation system 106 automatically selecting the car 610 in response to detecting the selection request while unselecting the remaining image portion 608. Because the object segmentation system 106 often determines unclassified object masks for all objects in the image 604 before detecting a selection request, the object segmentation system 106 can quickly provide the corresponding unclassified object mask. In this manner, as the user moves over, hovers over, or clicks different target objects, the object segmentation system 106 is able to quickly update the image 604 to select different corresponding unclassified object masks. Further, the object segmentation system 106 is able to provide an unclassified object mask for every object (i.e., every pixel) in the image 604. Indeed, regardless of which target object the user requests, the object segmentation system 106 is able to provide a corresponding object mask.

As mentioned above, in addition to automatically selecting objects in an image, the object segmentation system 106 is capable of automatically selecting partial objects. To illustrate, in one or more implementations, upon receiving an additional selection request, the object segmentation system 106 automatically selects a target partial object. For example, the object segmentation system 106 detects a second click of a previously selected target object or detects hovering the pointer 606 over the target object beyond a time threshold (e.g., 2 seconds). In some implementations, the object segmentation system 106 detects different selection methods indicating a selection request of a partial target object (e.g., a modifier keyboard key is combined with a mouse click).

In response to detecting the selection request of a partial target object (e.g., an additional selection request), the object segmentation system 106 automatically selects the target partial object. For example, the object segmentation system 106 provides the image 604 to a class-agnostic segmentation network that utilizes an affinity matrix and a learned dataset-encoded spatial location matrix to segment the image 604 into unclassified partial object masks, as described above. The object segmentation system 106 then utilizes the pointer 606 to identify and apply the corresponding unclassified partial object mask to select the target partial object.

Figure 6C:
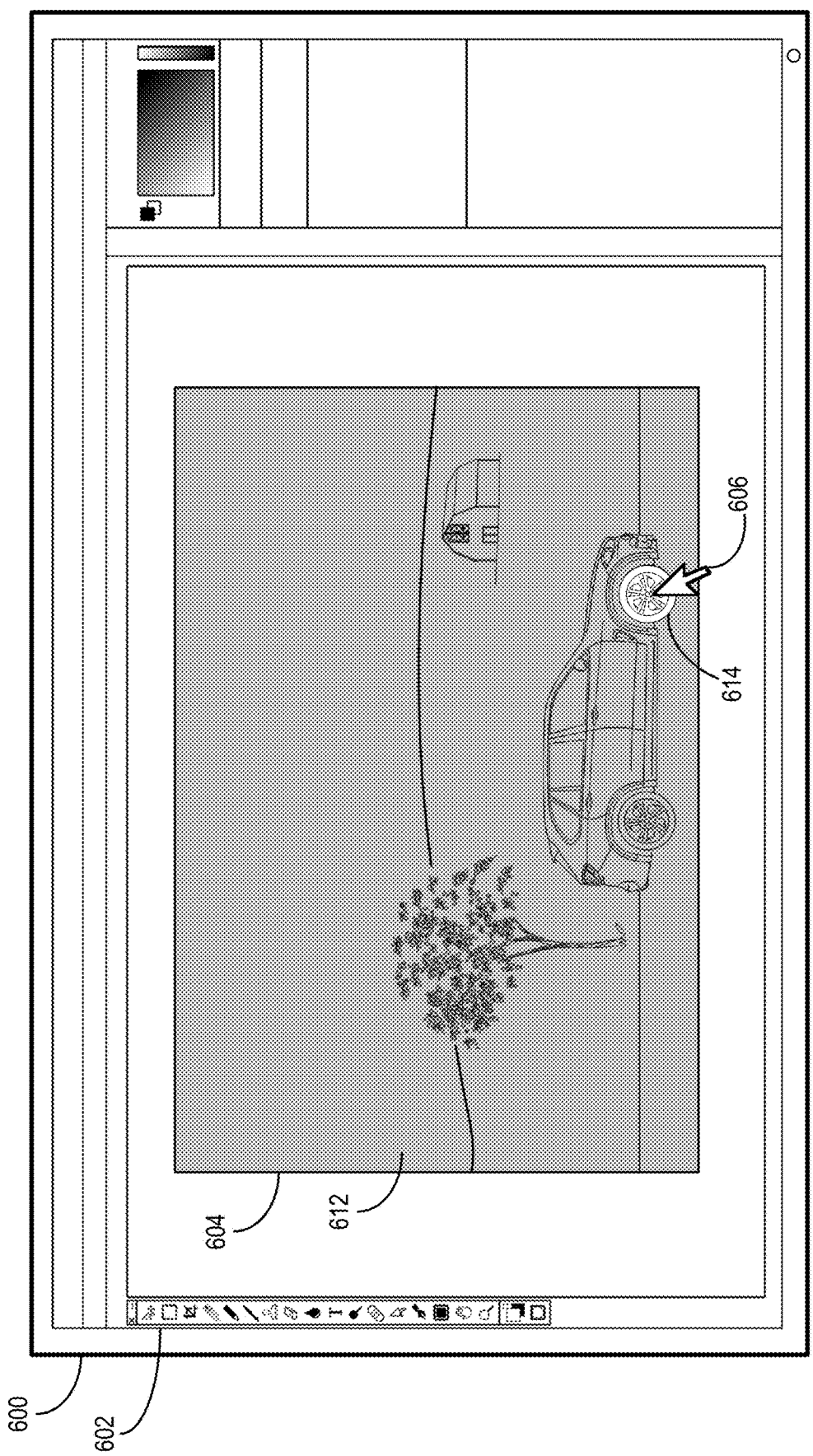

To illustrate, FIG. 6C shows the object segmentation system 106 automatically selecting the tire 612 of the car in response to detecting the additional selection request. For example, in one or more implementations, the object segmentation system 106 automatically selects the car in response to a first selection request, then selects the tire 614 in response to a second selecting request. In another example, the object segmentation system 106 determines that the first selection request is to select a partial object, and in response, automatically selects the tire 614.

As described above, the pointer 606 may correspond to a target object or a target partial object. In some implementations, the pointer 606 may further correspond to a more precise target partial object. In these implementations, the object segmentation system 106 provides a selection interface of each corresponding object or partial object instance.

Figure 6D:
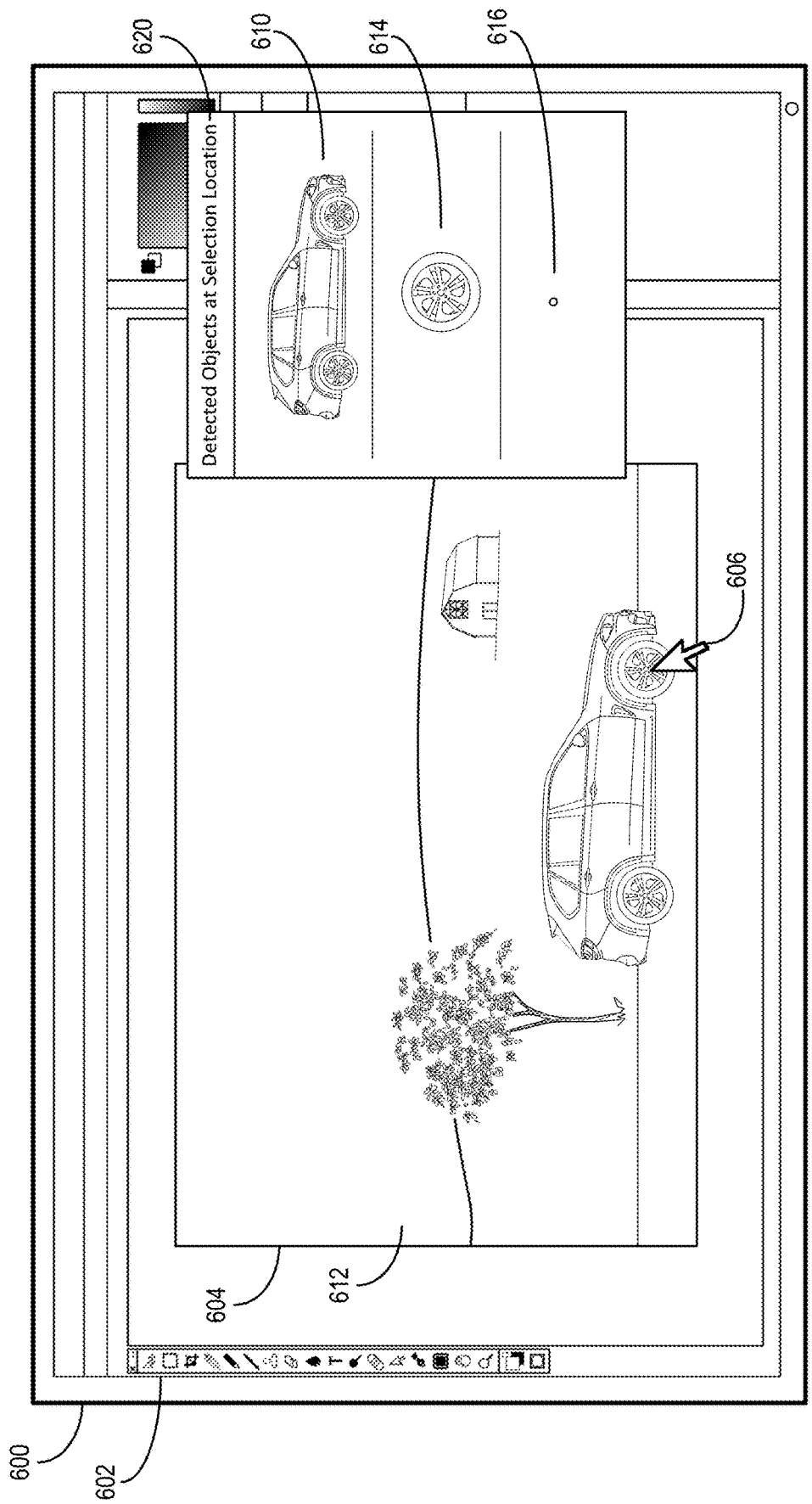

To illustrate, FIG. 6D shows a selection interface 620 that includes each object or partial object associated with the location of the pointer 606. For example, in response to detecting the selection request, the object segmentation system 106 determines that multiple objects and/or partial objects are located at or near to the location of the pointer 606. Accordingly, the object segmentation system 106 generates and displays each of the objects available to be automatically selected. As shown, the selection interface 620 includes the car 610, the tire 614, and the tire lug nut 616. Based on the user interacting with the selection interface 620, the object segmentation system 106 automatically selects the indicated object or partial object within the image 604.

As noted above, the object segmentation system 106 improves accuracy over conventional systems. For example, researchers compared the object segmentation system 106 to various conventional object detection systems. The results indicated that the object segmentation system 106 achieves comparable results with attention-based object detection neural networks when segmenting objects observed by the attention-based object detection neural networks during training. However, with respect to segmenting unknown objects, the object segmentation system 106 significantly outperformed the attention-based object detection neural networks in terms of object selection accuracy. Indeed, while the attention-based object detection neural networks provided the option to select a subset of objects in an image, the object segmentation system 106 facilitated the accurate selection of all objects in the same image.

Moreover, the researchers found that various implementations of the object segmentation system 106 yielded improved results. In particular, the researchers evaluated variants of the class-agnostic object segmentation model on traditional semantic-part segmentation models. The results are shown in Table 1:

| Model Variant | mIoU |
| --- | --- |
| Attention + Feature | 49.70 |
| Attention | 49.61 |
| Attention (Learning Constant C = 256) | 49.27 |
| Attention (Fix Constant C = 256) | 48.58 |
| Attention (Learning Constant C = 2) | 38.89 |
| Attention (Fix XY Coordinate C = 2) | 32.95 |

As shown, Table 1 includes model variants of the class-agnostic object segmentation model as well as mean Intersection over Union scores. For reference, "Attention+Feature" refers to utilizing a concatenated attention feature (e.g., Y=AF) and an original image feature (e.g., F) as the feature representation of an image; "Attention" refers to utilizing an attention feature (e.g., Y=AF) as the feature representation of the image; "Attention (Learning Constant C=256)" refers to utilizing a class-agnostic attention feature (e.g., Y=AC) as the feature representation of the image where C is of shape HW×256, randomly initialized, and learned in training; "Attention (Fixed Constant C=256)" is similar to Attention (Learning Constant C=256) except that C is fixed as initialized in training; "Attention (Learning Constant C=2)" is similar to Attention (Learning Constant C=256) except that C is of shape HW×2; and "Attention (Fixed XY Constant C=2)" is similar to Attention (Learning Constant C=2) except that C is initialized as relative coordinates (x, y) and fixed in training.

As also shown in Table 1, Attention+Feature produced the most favorable score while the score for Attention was slightly lower, showing that the Attention implementation also produces improves accuracy. Attention (Learning Constant C=256) scored slightly below the score for Attention, showing that a class-agnostic attention model alone sufficiently operates on semantic segmentation. Attention (Learning Constant C=256) likely scores lower because it loses some semantic information during operation. Attention (Fix Constant C=256) scored slightly below Attention (Learning Constant C=256), showing that this type of class-agnostic attention model achieves a reasonable performance when each location has a unique encoding in the constant matrix C. Indeed, Attention (Learned Constant C=256) reveals a slight performance boost by learning C (e.g., compared to Attention Learning Constant C=256).

Additionally, Attention (Learning Constant C=2) scored further below Attention (Learning Constant C=256), showing that the number of channels for C plays an important role. Indeed, while a single channel is enough to assign a unique encoding to each location, implementing more channels allows deep neural networks to more efficiently and accurately learn. Also, Attention (Fix XY Coordinate C=2) scored below Attention (learning constant C=2), showing that a manually set relative coordinate is a less-effective representation for locations in the class-agnostic object segmentation model.

Figure 7:
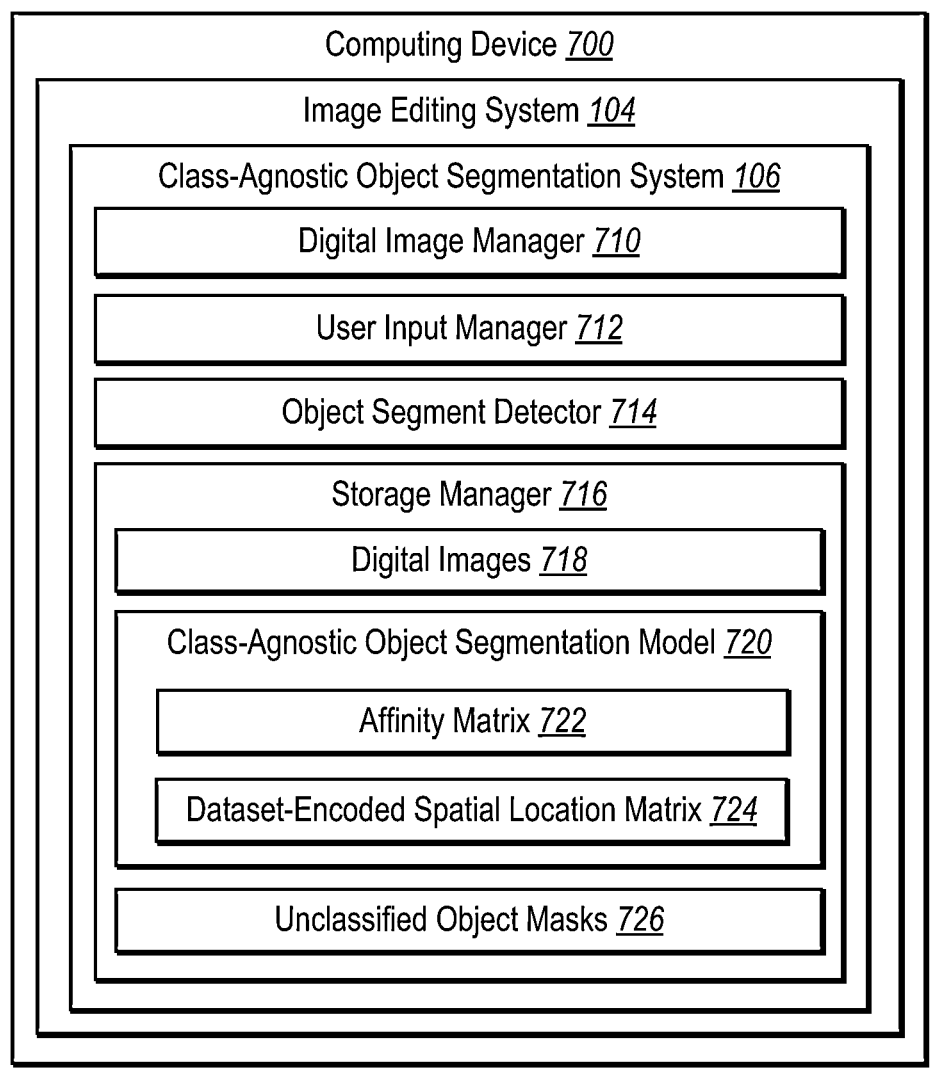
FIG. 7 illustrates a schematic diagram of the class-agnostic object segmentation system in accordance with one or more implementations.

Referring now to FIG. 7, additional detail is provided regarding the capabilities and components of the object segmentation system 106 in accordance with one or more implementations. In particular, FIG. 7 shows a schematic diagram of an example architecture of the object segmentation system 106 implemented within the image editing system 104 and hosted on a computing device 700.

As shown, the object segmentation system 106 is located on a computing device 700 within an image editing system 104. In general, the computing device 700 may represent various types of client devices. For example, in some implementations, the client is a mobile device, such as a laptop, a tablet, a mobile telephone, a smartphone, etc. In other implementations, the computing device 700 is a non-mobile device, such as a desktop or server, or another type of client device. Additional details with regard to the computing device 700 are discussed below as well as with respect to FIG. 9.

As illustrated in FIG. 7, the object segmentation system 106 includes various components for performing the processes and features described herein. For example, the object segmentation system 106 includes a digital image manager 710, a user input manager 712, an object segment detector 714, and a storage manager 716. As shown, the storage manager 716 includes digital images 718, a class-agnostic object segmentation model 720 having an affinity matrix 722 and a dataset-encoded spatial location matrix 724, and unclassified object masks 726. Each of the components mentioned above is described below in turn.

As mentioned above, the object segmentation system 106 includes the digital image manager 710. In general, the digital image manager 710 facilitates identifying, accessing, receiving, obtaining, generating, importing, exporting, copying, modifying, removing, and organizing images. In one or more implementations, the digital image manager 710 operates in connection with an image editing system 104 (e.g., an image editing application) to access and edit images, as described previously. In some implementations, the digital image manager 710 communicates with the storage manager 716 to store and retrieve the digital images 718, for example, within a digital image database managed by the storage manager 716.

As shown, the object segmentation system 106 includes the user input manager 712. In various implementations, the user input manager 712 is configured to detect, receive, and/or facilitate user input on the computing device 700. In some instances, the user input manager 712 detects one or more user interactions (e.g., a single interaction, or a combination of interactions) with respect to a digital image in a user interface. For example, the user input manager 712 detects a user interaction from a keyboard, mouse, touchpad, touchscreen, and/or any other input device in connection with the computing device 700. For instance, the user input manager 712 detects user input with respect to a selection request of a target object or partial object, as described above.

As shown, the object segmentation system 106 includes the object segment detector 714. In general, the object segment detector 714 utilizes one or more class-agnostic object segmentation models 720 to segment objects and/or partial objects in digital images 718. For example, in various implementations, the object segment detector 714 generates, identifies, obtains, trains, tunes, applies, executes, modifies, inferences, and/or otherwise manages class-agnostic object segmentation models 720 including one or more class-agnostic object segmentation neural networks. In some implementations, the object segment detector 714 trains a class-agnostic object segmentation model 720 to detect objects and segment corresponding pixels utilizing a combinational optimization algorithm, as described above.

In some implementations, the object segment detector 714 trains a class-agnostic object segmentation model 720 to segment partial objects and segment corresponding pixels utilizing the affinity matrix and a dataset-encoded spatial location matrix 724 learned across training a dataset, as described above. In various implementations, the object segment detector 714 utilizes one or more class-agnostic object segmentation models 720 to generates unclassified object masks 726 for objects and/or partial objects in a digital image, as described above.

In one or more implementations, the object segment detector 714 utilizes a class-agnostic object segmentation model 720 that includes an object detection model. For example, the object segment detector 714 determines an unclassified object mask 726 for a target object in response to a selection request, as described above. Further, the object segment detector 714 determines a classification label to associate with the target object utilizing the object detection model. In some implementations, the object detection model is located apart from the class-agnostic object segmentation model.

As shown, the object segmentation system 106 includes the storage manager 716. As mentioned above, the storage manager 716 includes the digital images 718, the class-agnostic object segmentation model 720, and the unclassified object masks 726. In one or more implementations, a class-agnostic object segmentation model 720 includes the affinity matrix 722 and the dataset-encoded spatial location matrix 724, as described above with respect to FIGS. 4A-4C. In alternative implementations, a class-agnostic object segmentation model 720 may determine the unclassified object masks without utilizing these components, as described above with respect to FIGS. 3A-3B.

Each of the components 710-726 of the object segmentation system 106 optionally includes software, hardware, or both. For example, the components 710-726 optionally include one or more instructions stored on a computer-readable storage medium and executable by processors of one or more computing devices, such as a client device (e.g., a mobile client device) or server device. When executed by the one or more processors, the computer-executable instructions of the object segmentation system 106 causes a computing device to perform the feature learning methods described herein. Alternatively, the components 710-726 optionally include hardware, such as a special-purpose processing device to perform a certain function or group of functions. In addition, the components 710-726 of the object segmentation system 106 optionally includes a combination of computer-executable instructions and hardware.

Furthermore, the components 710-726 of the object segmentation system 106 may be implemented as one or more operating systems, as one or more stand-alone applications, as one or more modules of an application, as one or more plug-ins, as one or more library functions or functions that may be called by other applications, and/or as a cloud-computing model. Thus, the components 710-726 may be implemented as a stand-alone application, such as a desktop or mobile application. Additionally, the components 710-726 may be implemented as one or more web-based applications hosted on a remote server. The components 710-726 may also be implemented in a suite of mobile device applications or "apps." To illustrate, the components 710-726 may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-7, the corresponding text, and the examples provide several different methods, systems, devices, and non-transitory computer-readable media of the object segmentation system 106. In addition to the foregoing, one or more implementations are described in terms of flowcharts comprising acts for accomplishing a particular result, such as the flowcharts of acts shown in FIG. 8. Additionally, the acts described herein may be repeated or performed in parallel with one another or parallel with different instances of the same or similar acts.

Figure 8:
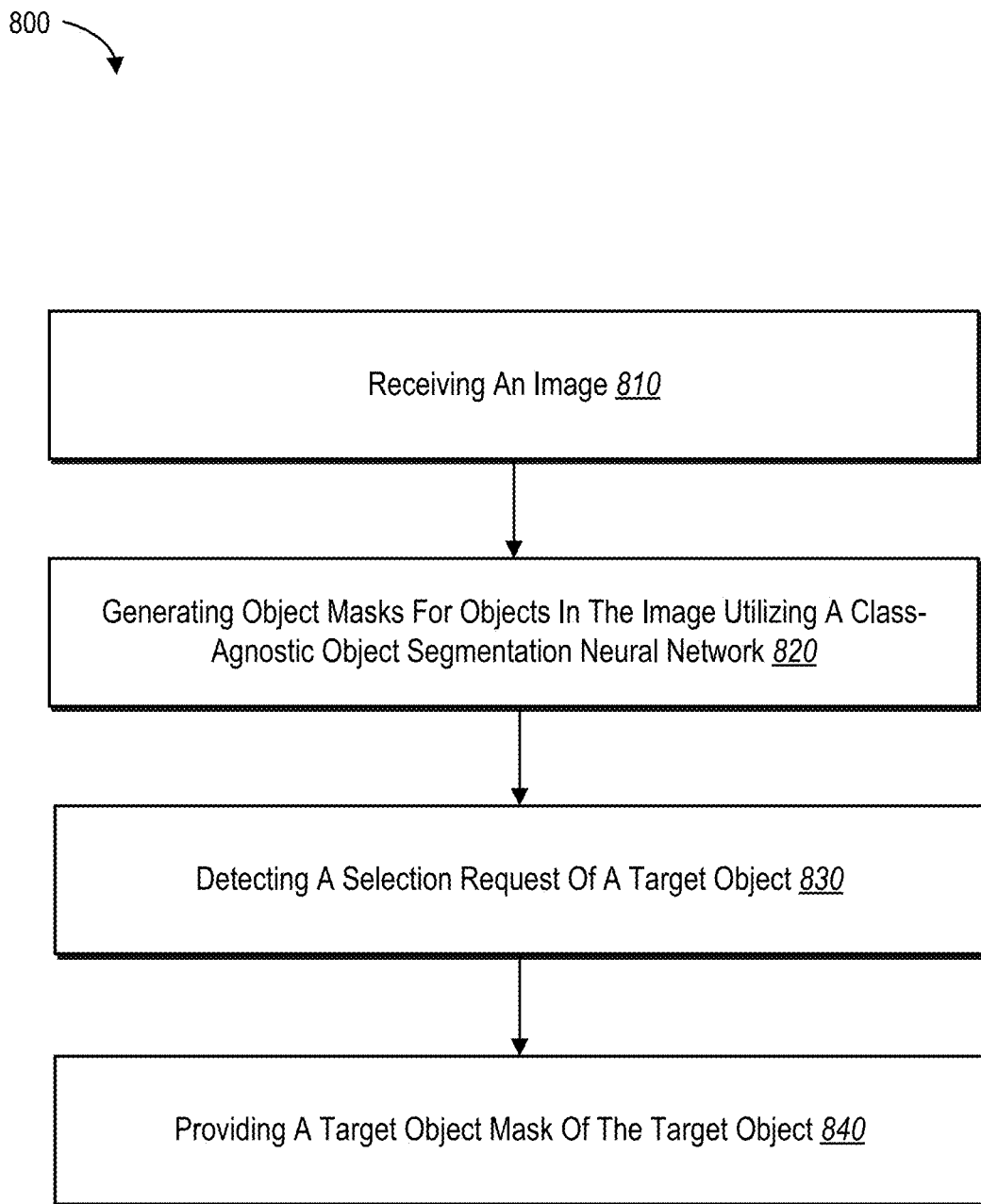
FIG. 8 illustrates a flowchart of a series of acts of utilizing a class-agnostic object segmentation model to automatically segment an object or partial object in a digital image in accordance with one or more implementations.

As mentioned, FIG. 8 illustrates a flowchart of a series of acts in accordance with one or more implementations. While FIG. 8 illustrates acts according to one implementation, alternative implementations may omit, add to, reorder, and/or modify any of the acts shown. The acts of FIG. 8 are optionally performed as part of a method. Alternatively, a non-transitory computer-readable medium comprises instructions that, when executed by one or more processors, cause a computing device to perform the acts of FIG. 8. In some implementations, a system is configured to perform the acts of FIG. 8.

To illustrate, FIG. 8 shows a flowchart of a series of acts 800 of utilizing a class-agnostic object segmentation model to automatically select objects or partial objects in digital images in accordance with one or more implementations. In various implementations, the series of acts 800 is implemented on one or more computing devices, such as the client device 102, the server device 108, the client device 600, or the computing device 700. In addition, in some implementations, the series of acts 800 is implemented in a digital environment for creating or editing digital content (e.g., digital images). For example, the series of acts 800 is implemented on one or more computing devices (e.g., server devices) having memory (or memory devices) that includes objects within a plurality of digital images and unclassified ground truth object masks corresponding to the objects. In some implementations, the memory (or memory devices) includes a trained class-agnostic object segmentation neural network.

The series of acts 800 includes an act 810 of receiving an image. For instance, the act 810 includes receiving a digital image including a plurality of objects. In one or more implementations, the act 810 includes providing the digital image for display within an image editing application.

As shown, the series of acts 800 also includes an act 820 of generating object masks for objects in the image utilizing a class-agnostic object segmentation neural network. For instance, the act 820 involves generating object masks for the plurality of objects in the digital image utilizing a class-agnostic object segmentation neural network that segments objects in digital images irrespective of semantic classifications. In example implementations, the act 820 includes allotting, assigning, or allocating every pixel in the digital image to an unclassified object mask when segmenting the digital image utilizing the class-agnostic object segmentation neural network.

In one or more implementations, the act 820 includes generating a feature vector or feature map from the digital image utilizing an encoder of a class-agnostic object segmentation neural network that detects objects in digital images irrespective of semantic classifications. In some implementations, the act 820 also includes modifying the feature vector by applying a dataset-encoded spatial location matrix to the feature vector. In various implementations, the act 820 includes generating object masks for one or more objects of the plurality of objects by decoding the modified feature vector utilizing a decoder of the class-agnostic object segmentation neural network. In some implementations, the object masks correspond to partial objects.

In various implementations, the act 820 includes generating an affinity matrix for the digital image that indicates encoded feature similarities between each pixel of the feature vector. In additional implementations, the act 820 includes modifying the feature vector by applying the dataset-encoded spatial location matrix to the affinity matrix. In some implementations, the act 820 also includes generating the modified feature vector by applying unique encodings learned for each location in the dataset-encoded spatial location matrix to corresponding locations within the affinity matrix.

In some implementations, the act 820 includes generating a feature vector having a first dimension (utilizing the class-agnostic object segmentation neural network); modifying the feature vector to a second dimension by applying the affinity matrix to the dataset-encoded spatial location matrix; and reshaping the modified feature vector to the first dimension. In one or more implementations, the act 820 includes generating the feature vector from the digital image utilizing the encoder of the class-agnostic object segmentation neural network by encoding deep features of pixels in the digital image into the feature vector and decoding the modified feature vector utilizing the decoder of the class-agnostic object segmentation neural network to generate partial object masks for more or more objects of the plurality of objects without classifying the partial object masks.

As shown in FIG. 8, the series of acts 800 further includes an act 830 of detecting a selection request of a target object. For instance, the act 830 includes detecting a selection request of a target object in the digital image. In one or more implementations, the act 830 includes detecting a selection request of a target partial object in the digital image. In some implementations, the act 830 includes generating the object masks for the plurality of objects in the digital image before detecting the selection request of the target object. In various implementations, the act 830 includes detecting an additional selection request of the target partial object.

As shown, the series of acts 800 also includes an act 840 of providing a target object mask of the target object. For instance, the act 840 includes providing a target object mask of the target object from the object masks generated for the digital image based on detecting the selection request. In one or more implementations, the act 840 includes providing a target partial object mask of the target partial object from the partial object masks. In various implementations, the act 840 includes generating a selection of the target object within the image editing application utilizing the target object mask to isolate pixels in the digital image corresponding to the target object. In some implementations, the act 840 includes providing a target object mask of the object in the digital image including the target partial object based on detecting the additional selection request.

The series of acts 800 optionally include additional acts. For example, in one or more implementations, the series of acts 800 includes the acts of utilizing an object classification model to identify one or more objects of the plurality of objects within the digital image; detecting an additional selection request of an additional target object in the digital image; determining that the additional target object corresponds to the one or more objects identified by the object classification model; and providing an additional target object mask of the additional target object from the object masks and providing a classification label of the additional target object based on detecting the additional selection request.

In various implementations, the series of acts 800 includes the acts of generating predicted unclassified object masks for the objects utilizing a class-agnostic object segmentation neural network; matching the predicted unclassified object masks to the unclassified ground truth object masks by determining a permutation that maximizes overlap between the predicted unclassified object masks and the unclassified ground truth object masks; determining a loss metric based on differences between the matched predicted unclassified object masks and unclassified ground truth object masks; and modifying parameters of the class-agnostic object segmentation neural network based on the determined loss metric.

In additional implementations, the series of acts 800 includes the act of learning a dataset-encoded spatial location matrix that uniquely encodes each location in the dataset-encoded spatial location matrix across the plurality of digital images. Further, in some implementations, the series of acts 800 includes the act of learning the dataset-encoded spatial location matrix by encoding, for a given pixel in the dataset-encoded spatial location matrix, a first location bias based on a first image of the plurality of digital images; encoding, for the given pixel in the dataset-encoded spatial location matrix, a second location bias based on a second image of the plurality of digital images; and aggregating (or averaging), for the given pixel in the dataset-encoded spatial location matrix, the first location bias and the second location bias.

In one or more implementations, the series of acts 800 includes the act of determining the permutation that maximizes the overlap between the predicted unclassified object masks to the unclassified ground truth object masks by utilizing an object detection similarity measure or algorithm to compare a set of predicted unclassified object masks in a target digital image to a set of unclassified ground truth object masks for the target digital image. In some implementations, the series of acts 800 includes the act of determining the permutation that minimizes the pixel overlap difference between the predicted unclassified object masks to the unclassified ground truth object masks by utilizing a combinational optimization algorithm to compare a plurality of permutations that include different combinations of matches between the predicted unclassified object masks and the unclassified ground truth object masks.

In various implementations, the series of acts 800 includes the acts of determining a loss metric by utilizing a dice loss function that minimizes a distance between the predicted unclassified object masks and the unclassified ground truth object masks while controlling for data imbalances between positive and negative samples. In some implementations, the series of acts 800 includes the act of modifying the parameters of the class-agnostic object segmentation neural network by backpropagating the determined loss metric to an encoder, a decoder, and a dataset-encoded spatial location matrix of the class-agnostic object segmentation neural network. In one or more implementations, the series of acts 800 includes the act of generating unclassified object masks for an input digital image utilizing the class-agnostic object segmentation neural network updated with the modified parameters.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object segmentation system to automatically select objects and partial objects on digital images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 9:
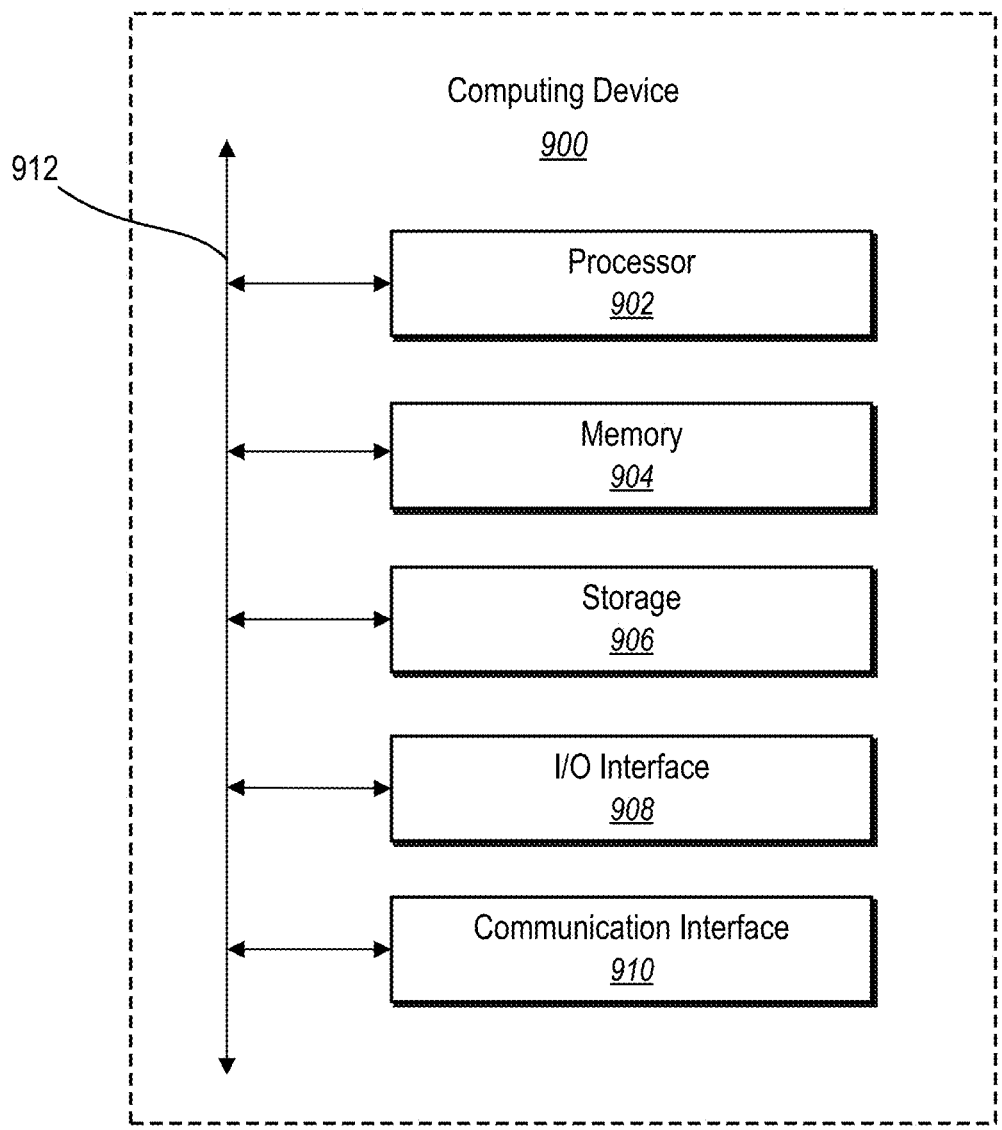
FIG. 9 illustrates a block diagram of an example computing device for implementing one or more implementations of the present disclosure.

FIG. 9 illustrates a block diagram of a computing device 900 that may be configured to perform one or more of the processes described above. One will appreciate that one or more computing devices, such as the computing device 900 may represent the computing devices described above (e.g., the client device 102, the server device 108, the client device 600, or the computing device 700). In one or more implementations, the computing device 900 may be a mobile device (e.g., a laptop, a tablet, a smartphone, a mobile telephone, a camera, a tracker, a watch, a wearable device, etc.). In some implementations, the computing device 900 may be a non-mobile device (e.g., a desktop computer, a server device, a web server, a file server, a social networking system, a program server, an application store, or a content provider). Further, the computing device 900 may be a server device that includes cloud-based processing and storage capabilities.

As shown in FIG. 9, the computing device 900 includes one or more processor(s) 902, memory 904, a storage device 906, I/O interfaces 908 (i.e., input/output interfaces), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other implementations. Furthermore, in certain implementations, the computing device 900 includes fewer components than those shown in FIG. 9. Components of the computing device 900 shown in FIG. 9 will now be described in additional detail.

In particular implementations, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 includes a non-transitory storage medium described above. The storage device 906 may include a hard disk drive (HDD), flash memory, a Universal Serial Bus (USB) drive, or a combination of these or other storage devices.

As shown, the computing device 900 includes one or more I/O interfaces 908, which are provided to allow a user to provide input to (e.g., user strokes), receive output from, and otherwise transfer data to and from the computing device 900. These I/O interfaces 908 may include a mouse, keypad or a keyboard, a touch screen, camera, optical scanner, network interface, modem, another known I/O device, or a combination of these I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 908 are configured to provide graphical data to a display for presentation to a user. The graphical data may be representative of one or more graphical user interfaces and/or any other graphical content as may serve a particular implementation.

The computing device 900 further includes a communication interface 910. The communication interface 910 includes hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 further includes a bus 912. The bus 912 includes hardware, software, or both that connects components of computing device 900.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for utilizing machine-learning models to process digital images, a computer-implemented method comprising:
   receiving a digital image comprising a plurality of objects;
   generating object masks for the plurality of objects in the digital image utilizing a class-agnostic object segmentation neural network that segments objects in digital images irrespective of semantic classifications;
   detecting a selection request of a target object in the digital image; and
   based on detecting the selection request, providing a target object mask of the target object from the object masks generated for the digital image.

2. The computer-implemented method of claim 1, further comprising allotting every pixel in the digital image to an unclassified object mask when segmenting the digital image utilizing the class-agnostic object segmentation neural network.

3. The computer-implemented method of claim 1, further comprising:
   providing the digital image for display within an image editing application; and
   generating a selection of the target object within the image editing application utilizing the target object mask to isolate pixels in the digital image corresponding to the target object.

4. The computer-implemented method of claim 1, further comprising generating the object masks for the plurality of objects in the digital image before detecting the selection request of the target object.

5. The computer-implemented method of claim 1, further comprising:
   utilizing an object classification model to identify one or more objects of the plurality of objects within the digital image;
   detecting an additional selection request of an additional target object in the digital image;
   determining that the additional target object corresponds to the one or more objects identified by the object classification model; and
   based on detecting the additional selection request, providing an additional target object mask of the additional target object from the object masks and a classification label of the additional target object.

6. A non-transitory computer-readable medium storing instructions that, when executed by at least one processor, cause a computer system to:
   receive a digital image comprising a plurality of objects;
   generate a feature vector from the digital image utilizing an encoder of a class-agnostic object segmentation neural network that detects objects in digital images irrespective of semantic classifications;
   modify the feature vector by applying a dataset-encoded spatial location matrix to the feature vector;
   generate partial object masks for one or more objects of the plurality of objects by decoding the modified feature vector utilizing a decoder of the class-agnostic object segmentation neural network;
   detect a selection request of a target partial object in the digital image; and
   based on detecting the selection request, provide a target partial object mask of the target partial object from the partial object masks.

7. The non-transitory computer-readable medium of claim 6, further comprising instructions that, when executed by at least one processor, cause the computer system to generate an affinity matrix for the digital image that indicates encoded feature similarities between each location of the feature vector.

8. The non-transitory computer-readable medium of claim 7, further comprising instructions that, when executed by at least one processor, cause the computer system to modify the feature vector by applying the dataset-encoded spatial location matrix to the affinity matrix.

9. The non-transitory computer-readable medium of claim 8, further comprising instructions that, when executed by at least one processor, cause the computer system to generate the modified feature vector by applying unique encodings learned for each location in the dataset-encoded spatial location matrix to corresponding locations within the affinity matrix.

10. The non-transitory computer-readable medium of claim 7, further comprising instructions that, when executed by at least one processor, cause the computer system to:
generate the feature vector having a first dimension;
modify the feature vector to a second dimension by applying the affinity matrix to the dataset-encoded spatial location matrix; and
reshape the modified feature vector to the first dimension.

11. The non-transitory computer-readable medium of claim 6, further comprising instructions that, when executed by at least one processor, cause the computer system to:
generate the feature vector from the digital image utilizing the encoder of the class-agnostic object segmentation neural network by encoding deep features of pixels in the digital image into the feature vector; and
decode the modified feature vector utilizing the decoder of the class-agnostic object segmentation neural network to generate the partial object masks for more or more objects of the plurality of objects without classifying the partial object masks.

12. The non-transitory computer-readable medium of claim 6, further comprising instructions that, when executed by at least one processor, cause the computer system to:
detect an additional selection request of the target partial object; and
based on detecting the additional selection request, provide a target object mask of the target object in the digital image comprising the target partial object.

13. A system comprising:
a memory device comprising:
objects within a plurality of digital images; and
unclassified ground truth object masks corresponding to the objects; and
at least one computing device configured to cause the system to:
generate predicted unclassified object masks for the objects utilizing a class-agnostic object segmentation neural network;
match the predicted unclassified object masks to the unclassified ground truth object masks by determining a permutation that maximizes overlap between the predicted unclassified object masks and the unclassified ground truth object masks;
determine a loss metric based on differences between the matched predicted unclassified object masks and unclassified ground truth object masks; and
modify parameters of the class-agnostic object segmentation neural network based on the determined loss metric.

14. The system of claim 13, wherein the at least one computing device is further configured to cause the system to learn a dataset-encoded spatial location matrix that uniquely encodes each location in the dataset-encoded spatial location matrix across the plurality of digital images.

15. The system of claim 14, wherein the at least one computing device is further configured to cause the system to learn the dataset-encoded spatial location matrix by:
encoding, for a given pixel in the dataset-encoded spatial location matrix, a first location bias based on a first image of the plurality of digital images;
encoding, for the given pixel in the dataset-encoded spatial location matrix, a second location bias based on a second image of the plurality of digital images; and
aggregating, for the given pixel in the dataset-encoded spatial location matrix, the first location bias and the second location bias.

16. The system of claim 14, wherein the at least one computing device is further configured to cause the system to determine the permutation that maximizes the overlap between the predicted unclassified object masks to the unclassified ground truth object masks by utilizing an object detection similarity measure to compare a set of predicted unclassified object masks in a target digital image to a set of unclassified ground truth object masks for the target digital image.

17. The system of claim 16, wherein the at least one computing device is further configured to cause the system to determine the permutation that minimizes pixel overlap difference between the predicted unclassified object masks to the unclassified ground truth object masks by utilizing a combinational optimization algorithm to compare a plurality of permutations that comprise different combinations of matches between the predicted unclassified object masks and the unclassified ground truth object masks.

18. The system of claim 14, wherein the at least one computing device is further configured to cause the system to determine the loss metric by utilizing a dice loss function.

19. The system of claim 14, wherein the at least one computing device is further configured to cause the system to modify the parameters of the class-agnostic object segmentation neural network by backpropagating the determined loss metric to an encoder, a decoder, and a dataset-encoded spatial location matrix of the class-agnostic object segmentation neural network.

20. The system of claim 14, wherein the at least one computing device is further configured to cause the system to generate unclassified object masks for an input digital image utilizing the class-agnostic object segmentation neural network updated with the modified parameters.

* * * * *